US012608689B2

(12) United States Patent
Gutierrez et al.

(10) Patent No.: US 12,608,689 B2
(45) Date of Patent: Apr. 21, 2026

(54) GENERATING SOCIAL MEDIA CONTENT FOR A USER ASSOCIATED WITH AN ENTERPRISE

(71) Applicant: STATE FARM MUTUAL AUTOMOBILE INSURANCE COMPANY, Bloomington, IL (US)

(72) Inventors: Jose Ivan Gutierrez, Laveen, AZ (US); Lauren Mitchell, Phoenix, AZ (US); Ross Wheeler, Scottsdale, AZ (US); Steve Amancha, Tempe, AZ (US); Anthony Welcome, Mesa, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 173 days.

(21) Appl. No.: 18/454,718

(22) Filed: Aug. 23, 2023

(65) Prior Publication Data

US 2025/0022071 A1 Jan. 16, 2025

Related U.S. Application Data

(60) Provisional application No. 63/526,353, filed on Jul. 12, 2023, provisional application No. 63/468,913, filed on May 25, 2023.

(51) Int. Cl.
*G06Q 30/02* (2023.01)
*G06Q 50/00* (2012.01)
*H04L 51/02* (2022.01)

(52) U.S. Cl.
CPC ............. *G06Q 50/01* (2013.01); *H04L 51/02* (2013.01)

(58) Field of Classification Search
CPC ........... G06Q 50/01; G06Q 30/0207–30/0277
See application file for complete search history.

(56) References Cited

U.S. PATENT DOCUMENTS

| | | | |
|---|---|---|---|
| 7,523,060 | B1 | 4/2009 | Tenorio |
| 8,682,804 | B1 | 3/2014 | Yoon |
| 10,107,708 | B1 | 10/2018 | Schick et al. |
| 10,409,995 | B1 | 9/2019 | Wasiq et al. |

(Continued)

FOREIGN PATENT DOCUMENTS

| | | |
|---|---|---|
| CN | 110175229 A | 8/2019 |
| CN | 114742657 A | 7/2022 |

(Continued)

OTHER PUBLICATIONS

Padia, J. (Jul. 25, 2023). Jimmy Padia on linkedin: Nyse floor talk: Floatbot: 13 comments. https://www.linkedin.com/posts/jimmypadia_nyse-floor-talk-floatbot-activity-7089664064603234304-60TU/?utm_source=shareutm_medium=member (3 pages).

(Continued)

*Primary Examiner* — Thuy N Nguyen

(57) ABSTRACT

Systems and methods disclosed herein relate to fine-tuning machine learning (ML) chatbots for an enterprise. The systems and methods may use ML chatbots and/or generative ML to generate social media content for a user associated with an enterprise. The systems and methods may fine-tune a base ML model, and use the fine-tuned ML model for the ML chatbot. A user profile may indicate user attributes, and a fine-tuned ML model may be loaded for the ML chatbot based upon an identified user profile.

20 Claims, 12 Drawing Sheets

(56) References Cited

U.S. PATENT DOCUMENTS

| 10,733,383 | B1 | 8/2020 | Shah et al. |
| 11,017,466 | B1 | 5/2021 | Cunningham et al. |
| 11,238,521 | B2 | 2/2022 | Malkiel et al. |
| 11,270,331 | B1 | 3/2022 | Breitweiser et al. |
| 11,314,846 | B1 | 4/2022 | Colin et al. |
| 11,444,893 | B1 | 9/2022 | Kalluri |
| 11,538,112 | B1 | 12/2022 | Singh et al. |
| 11,593,685 | B1 | 2/2023 | Chan et al. |
| 11,595,243 | B1 | 2/2023 | Schreiber et al. |
| 11,645,253 | B1 | 5/2023 | Xing et al. |
| 11,676,202 | B1 | 6/2023 | Latronico et al. |
| 11,726,889 | B1 | 8/2023 | Rao et al. |
| 11,763,148 | B2 | 9/2023 | Milman et al. |
| 11,769,013 | B2 * | 9/2023 | Machado ................. G06N 3/09 704/9 |
| 11,803,849 | B1 | 10/2023 | Lawrence |
| 11,900,451 | B1 | 2/2024 | King et al. |
| 11,929,963 | B1 | 3/2024 | Zheng |
| 11,942,079 | B2 | 3/2024 | Chun et al. |
| 11,989,636 | B1 | 5/2024 | Leeds et al. |
| 12,181,844 | B2 * | 12/2024 | Ramanasankaran ......................... G06N 3/0895 |
| 2006/0195335 | A1 | 8/2006 | Christian et al. |
| 2007/0233535 | A1 | 10/2007 | Kim |
| 2008/0196099 | A1 | 8/2008 | Shastri |
| 2010/0161503 | A1 | 6/2010 | Foster |
| 2012/0054040 | A1 * | 3/2012 | Bagherjeiran ......... G06Q 30/00 705/14.66 |
| 2013/0191223 | A1 * | 7/2013 | Harris ............... G06F 16/24575 705/14.66 |
| 2015/0128246 | A1 | 5/2015 | Feghali et al. |
| 2016/0156574 | A1 * | 6/2016 | Hum ....................... H04L 51/02 715/752 |
| 2016/0260033 | A1 | 9/2016 | Keyngnaert et al. |
| 2016/0379284 | A1 | 12/2016 | Alizadeh et al. |
| 2017/0353991 | A1 | 12/2017 | Tapia |
| 2018/0013783 | A1 | 1/2018 | Anachi |
| 2018/0121657 | A1 | 5/2018 | Hay et al. |
| 2018/0121808 | A1 | 5/2018 | Ramakrishna et al. |
| 2018/0150739 | A1 | 5/2018 | Wu |
| 2018/0189739 | A1 | 7/2018 | Kenthapadi et al. |
| 2018/0253780 | A1 | 9/2018 | Wang et al. |
| 2019/0005024 | A1 * | 1/2019 | Somech .................. H04L 67/14 |
| 2019/0087865 | A1 * | 3/2019 | Loree ................. G06Q 30/0269 |
| 2019/0089725 | A1 | 3/2019 | Anachi |
| 2019/0122232 | A1 * | 4/2019 | Leidi ....................... G06F 16/33 |
| 2019/0141058 | A1 | 5/2019 | Hassanzadeh et al. |
| 2019/0303798 | A1 | 10/2019 | Xie et al. |
| 2020/0012958 | A1 * | 1/2020 | Natanson ........... G06F 16/9537 |
| 2020/0053117 | A1 | 2/2020 | Mandal |
| 2020/0133756 | A1 | 4/2020 | Sun et al. |
| 2020/0184017 | A1 * | 6/2020 | Batra .................... G06F 16/953 |
| 2020/0258045 | A1 | 8/2020 | Knupfer |
| 2020/0259700 | A1 | 8/2020 | Bhalla et al. |
| 2020/0259701 | A1 | 8/2020 | Povoa |
| 2020/0272994 | A1 | 8/2020 | Silveira et al. |
| 2020/0327172 | A1 | 10/2020 | Coquard et al. |
| 2020/0334580 | A1 | 10/2020 | Sheopuri et al. |
| 2020/0342032 | A1 | 10/2020 | Subramaniam et al. |
| 2020/0372823 | A1 | 11/2020 | Edwards et al. |
| 2021/0021636 | A1 | 1/2021 | Sbandi |
| 2021/0056007 | A1 | 2/2021 | Viswanathan et al. |
| 2021/0081819 | A1 | 3/2021 | Polleri et al. |
| 2021/0083994 | A1 | 3/2021 | Pan et al. |
| 2021/0133807 | A1 * | 5/2021 | Kini ......................... G06N 3/08 |
| 2021/0141862 | A1 | 5/2021 | Huang et al. |
| 2021/0166244 | A1 | 6/2021 | Basam |
| 2021/0232613 | A1 | 7/2021 | Raval et al. |
| 2021/0249017 | A1 | 8/2021 | Burris et al. |
| 2021/0312561 | A1 | 10/2021 | Speasl et al. |
| 2021/0326757 | A1 | 10/2021 | Rawat et al. |
| 2021/0342918 | A1 | 11/2021 | Price et al. |
| 2021/0342946 | A1 | 11/2021 | Leise et al. |
| 2021/0349955 | A1 | 11/2021 | Megill et al. |
| 2021/0374168 | A1 | 12/2021 | Srinivasan et al. |
| 2022/0004479 | A1 | 1/2022 | Mccawley et al. |
| 2022/0012357 | A1 | 1/2022 | Rajeev |
| 2022/0094649 | A1 * | 3/2022 | Le ........................... G06F 40/30 |
| 2022/0107858 | A1 | 4/2022 | Jain et al. |
| 2022/0129261 | A1 | 4/2022 | Cabrera et al. |
| 2022/0138161 | A1 | 5/2022 | Anjum et al. |
| 2022/0138690 | A1 | 5/2022 | Anjum et al. |
| 2022/0148113 | A1 | 5/2022 | Mejia et al. |
| 2022/0156298 | A1 | 5/2022 | Mahmoud et al. |
| 2022/0229860 | A1 | 7/2022 | Ship et al. |
| 2022/0229978 | A1 | 7/2022 | Ship et al. |
| 2022/0244847 | A1 * | 8/2022 | Margot ................. G06F 3/0237 |
| 2022/0261711 | A1 | 8/2022 | Krishna et al. |
| 2022/0270120 | A1 | 8/2022 | King |
| 2022/0308943 | A1 | 9/2022 | Srinivasan et al. |
| 2022/0358225 | A1 | 11/2022 | Gadde et al. |
| 2022/0374483 | A1 * | 11/2022 | Hunt ....................... H04L 67/55 |
| 2022/0374598 | A1 | 11/2022 | Osuala et al. |
| 2022/0398492 | A1 * | 12/2022 | Navon .................. G06F 18/214 |
| 2022/0400159 | A1 | 12/2022 | Chi et al. |
| 2023/0018065 | A1 | 1/2023 | Schmitt et al. |
| 2023/0033680 | A1 | 2/2023 | Whatley |
| 2023/0080589 | A1 | 3/2023 | Gupta et al. |
| 2023/0080724 | A1 | 3/2023 | Stoops et al. |
| 2023/0092651 | A1 | 3/2023 | Joshi et al. |
| 2023/0099424 | A1 | 3/2023 | Hawkinson et al. |
| 2023/0110941 | A1 | 4/2023 | Makhija et al. |
| 2023/0124948 | A1 | 4/2023 | Li et al. |
| 2023/0135162 | A1 | 5/2023 | Cohen et al. |
| 2023/0252342 | A1 | 8/2023 | Stewart et al. |
| 2023/0273783 | A1 | 8/2023 | Molander et al. |
| 2023/0297887 | A1 | 9/2023 | Gurgu et al. |
| 2023/0316141 | A1 | 10/2023 | Toporek et al. |
| 2023/0316339 | A1 * | 10/2023 | Anderson ............. G06Q 50/12 705/14.72 |
| 2023/0367669 | A1 | 11/2023 | Tiwari et al. |
| 2023/0386657 | A1 | 11/2023 | Pascal et al. |
| 2023/0396568 | A1 | 12/2023 | Lutsyshyn |
| 2023/0401387 | A1 | 12/2023 | Alexander et al. |
| 2023/0401660 | A1 | 12/2023 | Ambrosch et al. |
| 2024/0037343 | A1 * | 2/2024 | Miller .................... G06Q 10/06 |
| 2024/0037896 | A1 | 2/2024 | Zhang et al. |
| 2024/0061835 | A1 * | 2/2024 | Subramanian ........ G06F 16/252 |
| 2024/0144372 | A1 | 5/2024 | Wu et al. |
| 2024/0169163 | A1 | 5/2024 | Nguyen |
| 2024/0171480 | A1 | 5/2024 | Sheoran et al. |
| 2024/0194180 | A1 | 6/2024 | Goldshtein et al. |
| 2024/0202452 | A1 | 6/2024 | Schillace et al. |
| 2024/0202457 | A1 | 6/2024 | Yogerst et al. |
| 2024/0202571 | A1 | 6/2024 | Yaghi et al. |
| 2024/0202572 | A1 | 6/2024 | Morales et al. |
| 2024/0211799 | A1 | 6/2024 | Mazor |
| 2024/0220674 | A1 | 7/2024 | Lopez et al. |
| 2024/0249318 | A1 * | 7/2024 | Spiegel .................. H04L 51/02 |
| 2024/0256429 | A1 | 8/2024 | Lucioni et al. |
| 2024/0257209 | A1 * | 8/2024 | Wang ................. G06Q 30/0631 |
| 2024/0267243 | A1 | 8/2024 | Ning et al. |
| 2024/0267344 | A1 * | 8/2024 | Mulligan ............. H04L 51/214 |
| 2024/0281677 | A1 | 8/2024 | Mifflin |
| 2024/0281706 | A1 | 8/2024 | Marzinzik et al. |
| 2024/0283697 | A1 | 8/2024 | Bates-Maricle |
| 2024/0289113 | A1 | 8/2024 | Bates-Maricle |
| 2024/0289872 | A1 | 8/2024 | Fields et al. |
| 2024/0291777 | A1 | 8/2024 | Fields et al. |
| 2024/0291778 | A1 | 8/2024 | Fields et al. |
| 2024/0291779 | A1 * | 8/2024 | Catalano ................. H04L 51/52 |
| 2024/0291785 | A1 | 8/2024 | Fields et al. |
| 2024/0296489 | A1 | 9/2024 | Brannan |
| 2024/0311618 | A1 | 9/2024 | Sukhavasi et al. |
| 2024/0330151 | A1 | 10/2024 | Williams et al. |
| 2024/0330455 | A1 | 10/2024 | Sahu |
| 2024/0330504 | A1 | 10/2024 | Williams et al. |
| 2024/0330654 | A1 | 10/2024 | Williams et al. |
| 2024/0331043 | A1 | 10/2024 | Williams et al. |
| 2024/0333728 | A1 | 10/2024 | Williams et al. |
| 2024/0333746 | A1 | 10/2024 | Williams et al. |
| 2024/0394503 | A1 | 11/2024 | Gutierrez et al. |
| 2024/0394593 | A1 | 11/2024 | Gutierrez et al. |

(56) References Cited

U.S. PATENT DOCUMENTS

| | | |
|---|---|---|
| 2024/0403566 A1 | 12/2024 | Sengupta et al. |
| 2024/0412145 A1 | 12/2024 | Wheeler et al. |
| 2024/0412168 A1 | 12/2024 | Shrader |
| 2024/0412313 A1 | 12/2024 | Wheeler et al. |
| 2024/0428259 A1 | 12/2024 | Wheeler et al. |
| 2024/0430702 A1 | 12/2024 | Chandran et al. |
| 2025/0029192 A1 | 1/2025 | Wheeler et al. |

FOREIGN PATENT DOCUMENTS

| | | |
|---|---|---|
| JP | 2019-514117 A | 5/2019 |
| KR | 10-2023-0018065 A | 2/2023 |
| KR | 10-2619905 B1 | 1/2024 |
| WO | 2020/198392 A1 | 10/2020 |
| WO | 2021/092164 A1 | 5/2021 |
| WO | 2024/112887 A1 | 5/2024 |

OTHER PUBLICATIONS

Wilson, J. (Mar. 2023). Should Financial ServicesCompanies Consider Open AI ?. LIMRA. https://www.limra.com/en/trending-topics/publications/marketfacts/2023/should-financial-services-companies-consider-open-ai (7 pages).

Winokur Munk, C. (Mar. 7, 2023). Will AI Models Like ChatGPT Take Your Insurance Job ?. lifeannuityspecialist.com. https://www.lifeannuityspecialist.com/pc/3965114/514174?all=true (3 pages).

Panjaitan, Hapizin Yonani, and Renny Risqiani. "Antecedents of Customer Satisfaction Towards Chatbot on Used Car Buying and Selling Platforms in Indonesia." APMBA (Asia Pacific Management and Business Application) 12.3 (2024): 315-334.

Unknown, "GPT-3 vs GPT-4 | What's the difference?", Jan. 2023, botpress.com, web.archive.org/web/20230131033431/https://botpress.com/blog/gpt-3-vs-gpt-4-whats-the-difference (Year: 2023).

Anonymous, Roots Automation Introduces InsurGPT—the World's Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).

Isenberg, The Compliance Tasks ChatGPT Can (and Can't) Handle, Ignites (published Apr. 3, 2023).

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).

Morris, Morgan Stanley Developing Chatbot with OpenAI, Ignites (published Mar. 15, 2023).

Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).

Smith, Insurer Zurich experiments with ChatGPT for claims and data mining, Financial Times (published Mar. 24, 2023).

Tuohy, What ChatGPT's Chores May Look Like in Life Insurance Industry, Life Annuity Specialist (published Apr. 21, 2023).

Dickson, How to create a private ChatGPT that interacts with your local documents, TechTalks. Retrieved from the Internet at: <URL:https://bdtechtalks.com/2023/06/01/create-privategpt-local-llm/> (Jun. 2023).

OpenPR Worldwide Public Relations, Press release, "Floatbot.AI Unveils Revolutionary Agent M—Generative AI (LLM or ChatGPT) Based Master Agent developer framework," Web page downloaded from Internet at <https://www.openpr.com/news/3147235/floatbot-ai-unveils-revolutionary-agent-m-generative-ai-llm>. Retrieved from Internet on Aug. 1, 2023.

Bodea, Constanta-Nicoleta, Maria-Iuliana Dascalu, and Alexandru Hang. "Chatbot-based training for project management: . . . " Research on project, programme and portfolio management: Integrating sustainability into project management. Springer International Publishing, 2021. (Year: 2021).

Casillo et al. "Chatbot in industry 4.0: An approach for training new employees." 2020 IEEE International Conference on Teaching, Assessment, and Learning for Engineering (TALE). IEEE, 2020. (Year: 2020).

Clarizia et al. "E-learning and industry 4.0: A chatbot for training employees." Proceedings of Fifth International Congress on Information and Communication Technology: ICICT 2020, London, vol. 2. Springer Singapore, 2021. (Year: 2021).

Dovetail Software. "The Ultimate Guide to Conversational AI Chatbots for HR." Dovetail Software Blog, Mar. 12, 2022 (last accessed on Jul. 8, 2025 at https://blog.dovetailsoftware.com/hr/ultimate-guide-to-ai-chatbots-for-hr). (Year: 2022).

English language translation of above-mentioned CN Pat. App. Pub. No. 110175229 A to Chen et al. (Year: 2019).

Grensing-Pophal, Lin. "How HR Is Using Virtual Chat and Chatbots." SHRM News, May 24, 2022 (last accessed on Jul. 8, 2025 at https://www.shrm.org/topics-tools/news/technology/how-hr-using-virtual-chat-chatbots). (Year: 2022).

Nguyen et al., "Deep Learning and Handheld Augmented Reality Based System for Optimal Data Collection in Fault Diagnostics Domain." arXiv preprint arXiv:2206.07772 (2022). (Year: 2022).

Shao, "Communication Fault Diagnosis Algorithm Based on BP Neural Network" 2021 3rd International Conference on Intelligent Control, Measurement and Signal Processing and Intelligent Oil Field (ICMSP), Xi'an, China, 2021, pp. 239-243, doi: 10.1109/ICMSP53480.2021.9513359. (Year: 2021).

Suresh et al. "Career counseling chatbot on Facebook messenger using AI." Proceedings of the International Conference on Data Science, Machine Learning and Artificial Intelligence. 2021. (Year: 2021).

JP 2019514117A (Machine translation); 2025 (Year: 2025).

Arshad, et al. "VocaVisionary: A Career Guidance Chatbot." 2024 Second International Conference on Advances in Information Technology (ICAIT). vol. 1. IEEE, 2024. (Year: 2024).

Ouyang et al., Training language models to follow instructions with human feedback, Cornell University (Mar. 4, 2022).

Prakash, Sajay, Koushik Sundar, and Eashaan Manohar. "Career Connect—A Personalized Job Recommendation AI Chatbot." (2024). (Year: 2024).

Yager, "Domain-Specific chatbots for science using embeddings", Jun. 2023, Royal Society of Chemistry, pp. 1-12, downloaded from https://pubs.rsc.org/en/content/articlepdf/2023/dd/d3dd00112a, DOI:10.1039/D3DD00112A (Year: 2023).

* cited by examiner

600

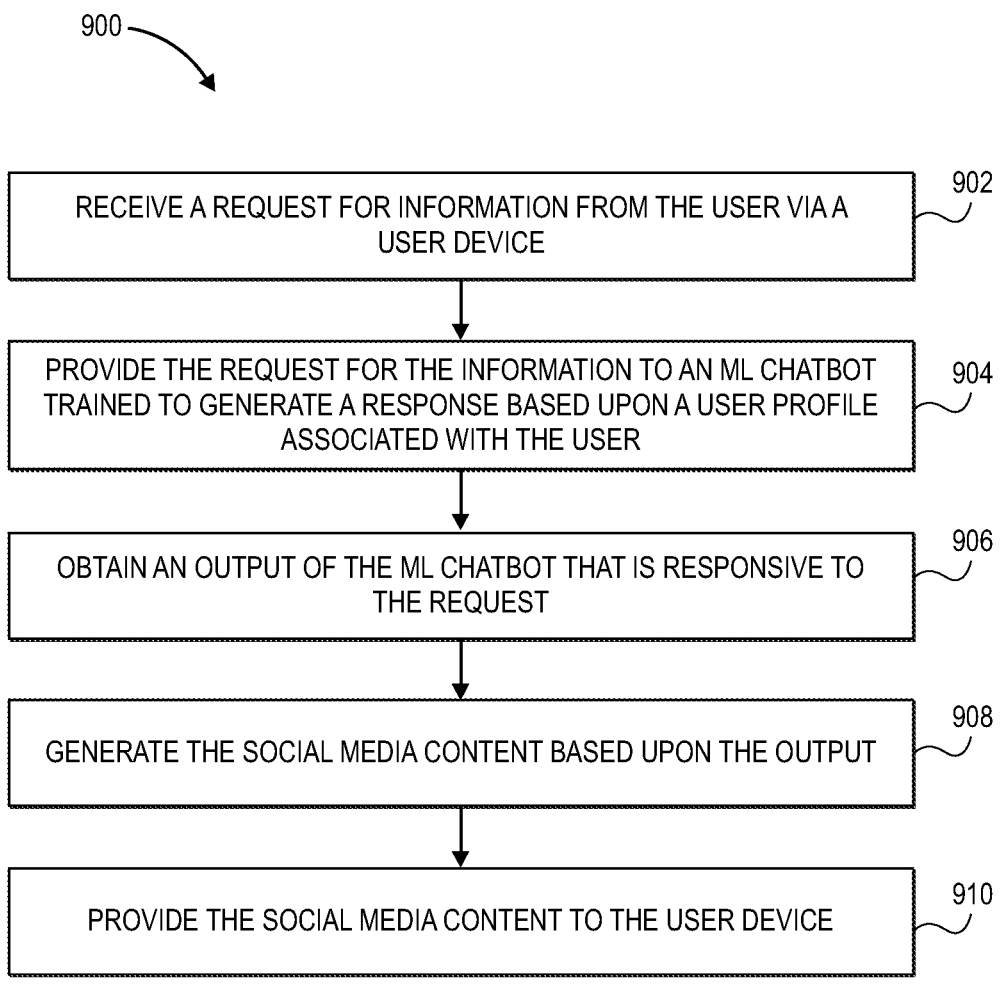

900

| | |
|---|---|
| RECEIVE A REQUEST FOR INFORMATION FROM THE USER VIA A USER DEVICE | 902 |

| | |
|---|---|
| PROVIDE THE REQUEST FOR THE INFORMATION TO AN ML CHATBOT TRAINED TO GENERATE A RESPONSE BASED UPON A USER PROFILE ASSOCIATED WITH THE USER | 904 |

| | |
|---|---|
| OBTAIN AN OUTPUT OF THE ML CHATBOT THAT IS RESPONSIVE TO THE REQUEST | 906 |

| | |
|---|---|
| GENERATE THE SOCIAL MEDIA CONTENT BASED UPON THE OUTPUT | 908 |

| | |
|---|---|
| PROVIDE THE SOCIAL MEDIA CONTENT TO THE USER DEVICE | 910 |

RECEIVE A REQUEST FROM THE USER VIA A USER DEVICE    1002

PROVIDE THE REQUEST TO AN ML CHATBOT TRAINED TO GENERATE A RESPONSE IN A STYLE OF COMMUNICATION EMULATING THE TRAITS OF THE PERSON    1004

OBTAIN AN OUTPUT OF THE ML CHATBOT THAT IS RESPONSIVE TO THE REQUEST    1006

GENERATE THE CONTENT BASED UPON THE OUTPUT    1008

PROVIDE THE CONTENT TO THE USER DEVICE    1010

1100

DETECT THE USER INTERACTION OF A USER AT THE PORTAL OF
THE ENTERPRISE                                                                    1102

PROVIDE THE REQUEST TO AN ML CHATBOT TRAINED TO GENERATE
A RESPONSE IN A STYLE OF COMMUNICATION EMULATING THE
TRAITS OF THE PERSON                                                              104

PROVIDE THE REQUEST FOR THE INFORMATION TO AN ML CHATBOT      1106

OBTAIN AN OUTPUT OF THE ML CHATBOT THAT IS RESPONSIVE
TO THE REQUEST                                                                    1108

PROVIDE THE OUTPUT TO THE USER DEVICE                                 1110

GENERATING SOCIAL MEDIA CONTENT FOR A USER ASSOCIATED WITH AN ENTERPRISE

CROSS-REFERENCE TO RELATED APPLICATIONS

This application claims priority to and the benefit of the filing date of provisional U.S. Patent Application No. 63/468,913, entitled "FINE-TUNING ML CHATBOTS FOR AN ENTERPRISE," filed on May 25, 2023, and provisional U.S. Patent Application No. 63/526,353, entitled "FINE-TUNING ML CHATBOTS FOR AN ENTER-PRISE," filed on Jul. 12, 2023, the entire contents of which are hereby expressly incorporated herein by reference.

FIELD OF THE INVENTION

The present disclosure generally relates to machine learn-ing (ML) chatbots, and more particularly, fine-tuning ML chatbots for an enterprise.

BACKGROUND

Generally, an enterprise, such as a business organizations or other entity engaged in commercial, industrial, or pro-fessional activities, may prefer to have a unified customer experience across the various platforms a customer may engage with the enterprise. For example, social media posts related to the enterprise may be invaluable to the brand, e.g., to increase user engagement. The content of the post may affect whether the user feels engaged with the brand. A post that is inconsistent with the brand identity may harm its reputation, decrease user engagement, and/or otherwise have deleterious effects.

Additionally, when the enterprise provides curated expe-riences, such as a tour, the enterprise may want to ensure the brand identity, among other things, is maintained throughout the experience. As one example, the enterprise may have persons or avatars that embody the brand identity that can provide a curated experience that enhances the values asso-ciated with the brand identity. Conversely, a curator that is inconsistent with the brand identity may impact the experi-ence for the user, which may lead to bad reviews, negative word of mouth, or other deleterious effects to the brand.

As yet another example, an enterprise may strive to align their customer touchpoints with how customers engage with their brand. When a website is confusing and the customer needs to hunt for information they regularly engage with, the negative user experience may damage the brand identity and drive traffic away from the website.

Advancements in generic artificial intelligence and machine learning may allow such systems to provide content which is responsive to a request, but may lack personality, style and/or other attributes that ensure the customer expe-rience is consistent with the brand identity, which may have deleterious effects for an enterprise.

The conventional information generation techniques may include additional ineffectiveness, inefficiencies, encum-brances, and/or other drawbacks.

SUMMARY

The present embodiments may relate to, inter alia, sys-tems and methods for fine-tuning ML chatbots for an enter-prise.

In one aspect, a computer-implemented method for gen-erating social media content for a user associated with an enterprise using ML. The computer-implemented method may be implemented via one or more local or remote processors, servers, transceivers, sensors, memory units, mobile devices, wearables, smart watches, smart contact lenses, smart glasses, augmented reality (AR) glasses, vir-tual reality (VR) headsets, mixed reality (MR) or extended reality glasses or headsets, voice bots or chatbots, ChatGPT bots, and/or other electronic or electrical components, which may be in wired or wireless communication with one another. For example, in one instance, the computer-imple-mented method may include: (1) receiving, by one or more processors from the user via a user device, a request for information; (2) providing, by the one or more processors, the request for the information to an ML chatbot, wherein: (i) the ML chatbot may be trained to generate a response (such as a verbal, audible, textual, display, visual, or other response) based upon a user profile associated with the user; and/or (ii) the ML chatbot may be trained using historical training data indicative of a style of communication asso-ciated with the user profile; (3) obtaining, by the one or more processors, an output of the ML chatbot that may be respon-sive to the request; (4) generating, by the one or more processors, the social media content based upon the output; and/or (5) providing, by the one or more processors, the social media content to the user device in one or more forms, such as a visual, text, or graphic content that is displayed and/or a verbal or audible content that is provided via a speaker or the like. The method may include additional, less, or alternate functionality or actions, including those dis-cussed elsewhere herein.

In another aspect, a computer system for generating social media content for a user associated with an enterprise using ML, may be provided. The computer system may include one or more local or remote processors, servers, transceiv-ers, sensors, memory units, mobile devices, wearables, smart watches, smart contact lenses, smart glasses, AR glasses, VR headsets, mixed or extended reality glasses or headsets, voice bots, chatbots, ChatGPT bots, and/or other electronic or electrical components, which may be in wired or wireless communication with one another. For example, in one instance, the computer system may include one or more processors configured to: (1) receive a request for information from the user via a user device; (2) provide the request for the information to an ML chatbot, wherein: (i) the ML chatbot may be trained to generate a response based upon a user profile associated with the user; and/or (ii) the ML chatbot may be trained using historical training data indicative of a style of communication associated with the user profile; (3) obtain an output of the ML chatbot that may be responsive to the request; (4) generate the social media content based upon the output; and/or (5) provide the social media content to the user device in one or more forms, such as a visual, text, or graphic content that is displayed and/or a verbal or audible content that is provided via a speaker or the like. The computer system may include additional, less, or alternate functionality, including that discussed elsewhere herein.

In another aspect, a non-transitory computer-readable medium storing processor-executable instructions that, when executed by one or more processors, cause the one or more processors to: (1) receive a request for information from the user via a user device; (2) provide the request for the information to an ML chatbot, wherein: (i) the ML chatbot may be trained to generate a response based upon a user profile associated with the user; and/or (ii) the ML chatbot may be trained using historical training data indicative of a style of communication associated with the user profile; (3) obtain an output of the ML chatbot that may be responsive to the request; (4) generate the social media content based upon the output; and/or (5) provide the social media content to the user device in one or more forms, such as a visual, text, or graphic content that is displayed and/or a verbal or audible content that is provided via a speaker or the like. The instructions may direct additional, less, or alternate functionality, including that discussed elsewhere herein.

Additional, alternate and/or fewer actions, steps, features and/or functionality may be included in an aspect and/or embodiments, including those described elsewhere herein.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 9 depicts a flow diagram of an exemplary computer-implemented method for generating social media content for a user associated with an enterprise using ML, according to one embodiment.

Figure 1:
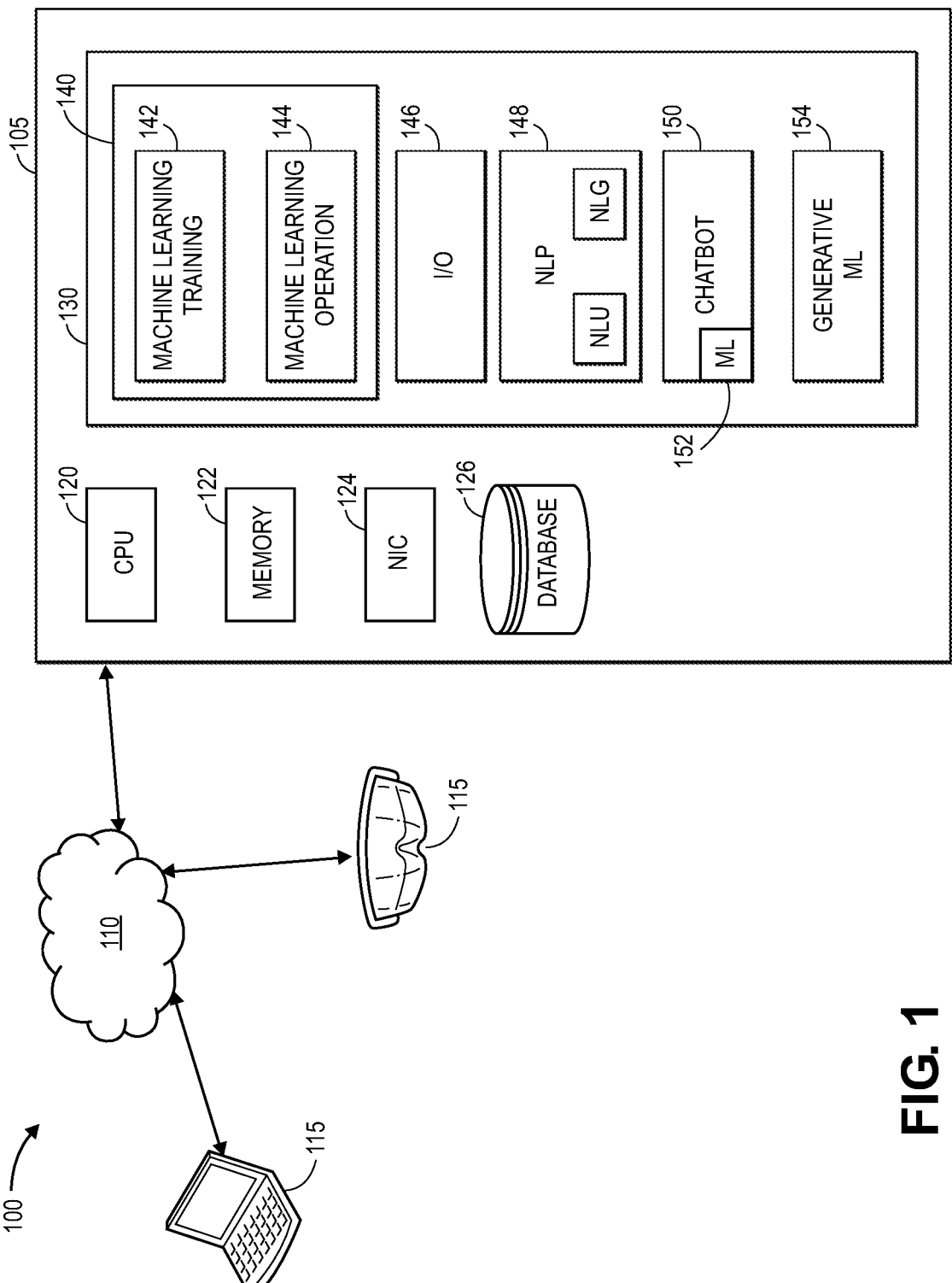
FIG. 1 depicts a block diagram of an exemplary computer environment in which methods and systems for fine-tuning ML chatbots for an enterprise are implemented, according to one embodiment.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Overview

The computer systems and methods disclosed herein generally relate to, inter alia, fine-tuning ML chatbots for an enterprise. The present embodiments may include (1) methods and systems for generating social media content for a user associated with an enterprise using ML and/or other processor analysis of historical data indicative of a style of communication associated with a user profile associated with a user; (2) methods and systems for providing information via an ML chatbot and/or voice bot emulating traits of a person; and/or (3) methods and systems for providing information based upon user interaction at a portal of an enterprise using ML and/or other processor analysis of historical data indicative of historical user interactions of a plurality of historical users at the portal. In certain embodiments, the inputs to and/or the outputs from the ML chatbots described herein may be in verbal, audible, visual, textual, graphical, document, and/or other form or format.

As used herein, the term augmented reality (AR) may refer to generating digital content (i.e., a virtual configuration) which is overlaid on a view of the user's physical environment via a display of a viewer device, such as on a transparent surface of a viewer device, such that a wearer/user of the AR viewer device (which may include AR glasses or headsets) is still able to view their physical environment. The virtual configuration may include virtual images, text, models, sounds, animations, videos, instructions, multimedia and/or other digitally-generated content.

As used herein, the term virtual reality (VR) may refer to generating digital content which is presented via a display of a viewer device, which may not include a transparent surface nor a direct view of one's physical environment. This may include virtual images, text, models, sounds, animations, videos, instructions, multimedia and/or other digitally-generated content via the display of the viewer device (which may be a VR headset or glasses), wherein the display may be a screen such as an OLED screen. The viewer device may present the virtual configuration via the display of the viewer device, which may include a virtual simulation and/or digital recreation, of the physical environment.

As used herein, the term mixed reality (MR) may refer to a viewer device which is capable of displaying both AR and/or VR content. The terms AR, VR and/or MR may be used interchangeably herein.

As used herein, the term viewer device may refer to a device having a display which may be capable of presenting virtual configurations using AR and/or VR techniques.

Generating Social Media Content for a User Associated with an Enterprise Using ML In some embodiments, the systems and methods may include an ML chatbot providing personalized content related to an enterprise. The content may be based upon information in a user profile, such as for an agent of the enterprise. The user profile may contain information and/or attributes of a user associated with the user profile, such as social media postings of the user, background information of the user, employment location of the user, products/services the user may offer and/or promote for the enterprise, and/or target customer demographics of the user (e.g., for selling products/services for the enterprise) and/or enterprise, or any other suitable user information or user attributes. In one example, the agent may submit a request such as a question which is provided as an input to the ML chatbot, and receive as an output of the ML chatbot content that includes proprietary information of the enterprise, and is also personalized in the style of communication of the agent. The ML chatbot may simplify producing social media content which is non-generic and/or personalized for an agent, which may increase end-user engagement.

The systems and methods may include a sentiment analysis model to identify, remove and/or exclude from the training data social media postings or otherwise content which may have undesirable traits, such as messaging which is not aligned with a brand identity of the enterprise. If an agent's past social media postings do not represent the intending tone and/or messaging of the enterprise, and the like, such postings may be excluded from a training data set used to train the ML chatbot and/or removed from their social media account.

The systems and methods may include a default and/or generic user profile, e.g., for a new agent of the enterprise, which may be adapted over time based upon the agent's manually created (i.e., without the use of an ML chatbot) postings. The default profile may be configured to exhibit a positive attitude, speak in a manner typical of certain demographics, and the like. In one aspect, the trained ML chatbot may learn what type of product(s) an agent sells, or other information associated with the agent (e.g., indicated in the agent's user profile), and the ML chatbot may be trained and/or tuned for a specific user (e.g., the agent) based upon such information.

The systems and methods may include (1) receiving a request for information from the user via a user device; (2) providing the request for the information to an ML chatbot, wherein: (i) the ML chatbot may be trained to generate a response based upon a user profile associated with the user; and/or (ii) the ML chatbot may be trained using historical training data indicative of a style of communication associated with the user profile; (3) obtain an output of the ML chatbot that may be responsive to the request; (4) generating the social media content based upon the output; and/or (5) providing the social media content to the user device.

In an aspect, the ML chatbot may be based upon a fine-tuned ML model including a base ML model. The base ML model may be trained using historical enterprise data. The historical enterprise data may be indicative of information related to the enterprise, such as product information (e.g., products offered, pricing), contact information, office locations, hours of operation, frequently asked questions, etc.

The ML chatbot may include fine-tuning the base ML model based upon a plurality of training data associated with a plurality of user profiles to generate a plurality of fine-tuned ML models associated with the plurality of user profiles. The user profiles may be profiles of actual people/ agents of the enterprise, and/or of generic agents having certain attributes e.g., if an agent does not have enough personal information to train an ML model. The plurality of fine-tuned ML models may be stored on a memory.

In one aspect, the system may obtain the user profile associated with the user of the system and identify a fine-tuned ML model of the plurality of fine-tuned ML models associated with the user profile of the user. The user profile may indicate user attributes such as a role of the user at the enterprise, the user's location, product offerings of the enterprise, and/or target demographics of the enterprise. The ML chatbot may customize its responses according to the user attribute information.

In one aspect, the system may load the identified fine-tuned ML model for the ML chatbot into one or more memories for use as the ML chatbot, which may allow the ML chatbot to emulate the user. In one aspect, the system may track user data associated with the user, such as social media posts, user attribute data, and/or any other suitable data associated with the user and/or user profile. The system may update the user profile associated with the user with the user data, and/or train the fine-tuned ML model associated with the user profile with the updated user profile. This may allow the ML chatbot to emulate the most up-to-date style of the user.

The historical training data to train the ML model may include one or more historical social media posts of the user which may indicate a user's style of communication, such as vocabulary, phrasing, accent, tone, sentiment, conciseness, and/or preferred medium of communication (e.g., animated GIFs, emojis, videos, etc.), or any other content indicative of a user's style of communication. The system may identify and/or remove data indicating an exclusionary sentiment of the user from training data and/or a social media account of the user, such as posts using language, having content, and/or expressing view which may not be aligned with the enterprise (e.g., its brand identity).

Providing Information Via an ML Chatbot and/or Voice Bot Emulating Traits of a Person In some embodiments, systems and methods may train an ML chatbot/model to replicate a particular individual's personality, e.g., by generating vector embeddings of historical documents created by individuals. A user may ask the ML chatbot questions and receive answers in style of the individual and/or based upon their knowledge, in an interactive manner. This may include providing guided virtual tours (e.g., AR, VR and/or metaverse tours) in the style of an individual. In one aspect, a user may provide a query to the ML chatbot, and the ML chatbot and/or ML model may generate output which controls a metaverse experience of the user.

The systems and methods may include (1) receiving from the user via a user device, a request; (2) providing the request to an ML chatbot, wherein: (i) the ML chatbot may be trained to generate a response, the response being provided in a style of communication emulating the traits of the person; and/or (ii) the ML chatbot may be trained using historical training data indicative of the traits of the person; (3) obtaining an output of the ML chatbot that may be responsive to the request; (4) generating content based upon the output; and/or (5) providing the content to the user device.

The ML chatbot may be based upon a fine-tuned ML model including a base ML model trained using historical base model training data. The historical base model training data may be indicative of information associated with the request. In one example, the request may be related to an art exhibit and the historical base model training data may include data indicative of artists of the exhibit, works of art of the exhibit, styles of painting of the exhibit, types of sculpture of the exhibit, etc.

The base model may be fine-tuned with a plurality of training data associated with a plurality of persons having associated traits. The traits may include, and/or the training data may indicate, vocabulary, phrasing, accent, tone, sentiment, conciseness, humor, and/or depth of knowledge of the plurality or persons.

The ML chatbot may be trained using historical training data including historical content created by the person, such as written content, audio content, image content, and/or video content, as well as other suitable personal content. The system may generate a plurality of fine-tuned ML models associated with the respective plurality of persons and/or store the plurality of fine-tuned ML models, e.g., on memory.

The system may obtain an indication of a person, e.g., via a user interface which displays one or more persons for the user to select. Upon identifying a fine-tuned ML model associated with the indicated person, the system may load the identified fine-tuned ML model for use as the ML chatbot.

In one aspect, the ML model may output content associated with a tour, e.g., an audio-guided tour, an AR tour, a VR tour, and/or a tour in the metaverse. For example, if an AR tour, the ML model may present tour information based upon the location of the user, e.g., providing information to overlay upon objects within the user's field of view throughout the tour. In one aspect, the user and/or ML chatbot may be able to control the content of the virtual tour, which may include real-time control of the virtual tour and/or environment based upon user interaction with the ML chatbot.

ML Chatbots and Generative AI for Providing Information Based Upon User Interaction at a Portal of an Enterprise Using ML In some embodiments, the systems and methods may include an ML model which receives a request for information at a portal of an enterprise (e.g., website, a mobile application, an interactive-voice response system, in the metaverse, etc.) as an input, and provides an output via an ML chatbot that is responsive to the request. The systems and methods may track via the portal what a customer searches for, what a customer clicks on, and/or what questions a customer asks (e.g., to a virtual agent/chatbot, regarding products offered, etc.). The systems and methods may determine what the customer needs, what may be important to the customer marketplace, how to boost customer marketing, and/or what questions a customer may be comfortable asking. e.g., to an ML chatbot versus a human. The ML chatbot may be trained to prioritize responses which align with the user based upon their interactions at the portal.

The systems and methods may include (1) detecting the user interaction of a user at the portal of the enterprise; (2) receiving via the portal, a request for information from the user; (3) providing the request for the information to an ML chatbot, wherein: (i) the ML chatbot may be trained to generate a response based upon the user interaction of the user at the portal; and/or (ii) the ML chatbot may be trained using historical training data indicative of historical user interactions of a plurality of historical users at the portal; (4) obtaining an output of the ML chatbot that may be responsive to the request; and/or (5) providing the output to the user device.

The ML chatbot may be based upon a fine-tuned ML model including a base ML model trained using historical enterprise data. The historical enterprise data may be indicative of information related to the enterprise, such as product information (e.g., products offered, pricing), contact information, office locations, hours of operation, frequently asked customer questions, etc.).

The system may fine-tune the ML base model based upon user profiles associated with user interactions at the portal. The system may analyze a user profile to generate marketing content associated with the user and/or provide the marketing content to the user device. Marketing content may include advertisements, incentives, and/or rewards, etc.

The system may track (e.g., via a session identifier, a user identifier and/or a user device identifier) the user interaction of the user at the portal. The user interaction may include entering text, a signal from an input device, visiting a hyperlink, uploading content, and/or viewing content. The system may classify the user interaction data via a classification model to output a particular type of user activity. Types of user activity may include searching, an inquiry, requesting a quote, and/or submitting a claim, or other suitable user activity. The system may generate a plurality of fine-tuned ML models associated various types of user activity, and/or may store the plurality of fine-tuned ML models, e.g., on memory.

Exemplary Computer Environment

FIG. 1 depicts an exemplary environment 100 associated with customizing ML chatbots for an enterprise. Although FIG. 1 depicts certain entities, components, equipment, and devices, it should be appreciated that additional or alternate entities, components, equipment, and devices are envisioned.

As illustrated in FIG. 1, the environment 100 may include in one aspect, one or more servers 105 which may perform the functionalities, such as fine-tuning ML chatbots for an enterprise. The server 105 may be part of a cloud network or may otherwise communicate with other hardware or software components within one or more cloud computing environments to send, retrieve, or otherwise analyze data or information described herein. For example, in certain aspects of the present techniques, the computing environment 100 may comprise an on-premise computing environment, a multi-cloud computing environment, a public cloud computing environment, a private cloud computing environment, and/or a hybrid cloud computing environment. For example, an entity (e.g., a business) may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Alternatively, or in addition, aspects of the public cloud may be hosted on-premise at a location owned/controlled by the business. The public cloud may be partitioned using visualization and multi-tenancy techniques and may include one or more infrastructure-as-a-service (IaaS) and/or platform-as-a-service (PaaS) services.

A network 110 may comprise any suitable network or networks, including a local area network (LAN), wide area network (WAN), Internet, or combination thereof. For example, the network 110 may include a wireless cellular service (e.g., 4G, 5G, 6G, etc.). Generally, the network 110 enables bidirectional communication between the servers 105 and a user device 115. In one aspect, the network 110 may comprise a cellular base station, such as cell tower(s), communicating to the one or more components of the computing environment 100 via wired/wireless communications based upon any one or more of various mobile phone standards, including NMT, GSM, CDMA, UMTS, LTE, 5G, 6G, or the like. Additionally or alternatively, the network 110 may comprise one or more routers, wireless switches, or other such wireless connection points communicating to the components of the computing environment 100 via wireless communications based upon any one or more of various wireless standards, including by non-limiting example, IEEE 802.11a/ac/ax/b/c/g/n (Wi-Fi), Bluetooth, and/or the like. The server 105 may include one or more network interface controllers (NICs) 124. The NIC 124 may include any suitable network interface controller(s), and may communicate over the network 110 via any suitable wired and/or wireless connection. The NIC 124 may include one or more transceivers (e.g., WWAN, WLAN, and/or WPAN transceivers) functioning in accordance with IEEE standards, 3GPP standards, or other standards, and that may be used in receipt and transmission of data via external/network ports connected to the network 110.

The server 105 may include one or more processors 120. The processors 120 may include one or more suitable processors (e.g., central processing units (CPUs) and/or graphics processing units (GPUs)). The processors 120 may be connected to a memory 122 via a computer bus (not depicted) responsible for transmitting electronic data, data packets, or otherwise electronic signals to and from the processors 120 and memory 122 in order to implement or perform the machine-readable instructions, methods, processes, elements, or limitations, as illustrated, depicted, or described for the various flowcharts, illustrations, diagrams, figures, and/or other disclosure herein. The processors 120 may interface with the memory 122 via a computer bus to execute an operating system (OS) and/or computing instructions contained therein, and/or to access other services/aspects. For example, the processors 120 may interface with the memory 122 via the computer bus to create, read, update, delete, or otherwise access or interact with the data stored in the memory 122 and/or a database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein.

The memory 122 may store a plurality of computing modules 130, implemented as respective sets of computer-executable instructions (e.g., one or more source code libraries, trained ML models such as neural networks, convolutional neural networks, etc.) as described herein.

In general, a computer program or computer based product, application, or code (e.g., the model(s), such as ML models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The database 126 may be a relational database, such as Oracle, DB2, MySQL, a NoSQL based database, such as MongoDB, or another suitable database. The database 126 may store data that is used to train and/or operate one or more ML models, provide AR and/or VR models/displays, provide a user experience within the metaverse, among other things.

In one aspect, the computing modules 130 may include an ML module 140. The ML module 140 may include ML training module (MLTM) 142 and/or ML operation module (MLOM) 144. In some embodiments, at least one of a plurality of ML methods and algorithms may be applied by the ML module 140, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of ML, such as supervised learning, unsupervised learning, and reinforcement learning.

In one aspect, the ML based algorithms may be included as a library or package executed on server(s) 105. For example, libraries may include the TensorFlow based library, the PyTorch library, and/or the scikit-learn Python library.

In one embodiment, the ML module 140 employs supervised learning, which involves identifying patterns in existing data to make predictions about subsequently received data. Specifically, the ML module is "trained" (e.g., via MLTM 142) using training data, which includes exemplary inputs and associated exemplary outputs. Based upon the training data, the ML module 140 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing it with a large sample of data with known characteristics or features.

In another embodiment, the ML module 140 may employ unsupervised learning, which involves finding meaningful relationships in unorganized data. Unlike supervised learning, unsupervised learning does not involve user-initiated training based upon exemplary inputs with associated outputs. Rather, in unsupervised learning, the ML module 140 may organize unlabeled data according to a relationship determined by at least one ML method/algorithm employed by the ML module 140. Unorganized data may include any combination of data inputs and/or ML outputs as described above.

In yet another embodiment, the ML module 140 may employ reinforcement learning, which involves optimizing outputs based upon feedback from a reward signal. Specifically, the ML module 140 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

The MLOM 144 may comprising a set of computer-executable instructions implementing ML loading, configuration, initialization and/or operation functionality. The MLOM 144 may include instructions for storing trained models (e.g., in the electronic database 126). As discussed, once trained, the one or more trained ML models may be operated in inference mode, whereupon when provided with de novo input that the model has not previously been provided, the model may output one or more predictions, classifications, etc., as described herein.

In operation, ML model training module 142 may access database 126 or any other data source for training data suitable to generate one or more ML models. The training data may be sample data with assigned relevant and comprehensive labels (classes or tags) used to fit the parameters (weights) of an ML model with the goal of training it by example. In one aspect, once an appropriate ML model is trained and validated to provide accurate predictions and/or responses, the trained model may be loaded into MLOM 144 at runtime to process input data and generate output data.

While various embodiments, examples, and/or aspects disclosed herein may include training and generating one or more ML models for the server 105 to load at runtime, it is also contemplated that one or more appropriately trained ML models may already exist (e.g., in database 126) such that the server 105 may load an existing trained ML model at runtime. It is further contemplated that the server 105 may retrain, fine-tune, update and/or otherwise alter an existing ML model before and/or after loading the model at runtime.

In one aspect, the computing modules 130 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as the computer network 110 and/or the user device 115 (for rendering or visualizing) described herein. In one aspect, the servers 105 may include a client-server platform technology such as ASP .NET, Java J2EE, Ruby on Rails, Node.js, a web service or online API, responsive for receiving and responding to electronic requests.

I/O module 146 may further include or implement an operator interface configured to present information to an administrator or operator and/or receive inputs from the administrator and/or operator. An operator interface may provide a display screen. The I/O module 146 may facilitate I/O components (e.g., ports, capacitive or resistive touch sensitive input panels, keys, buttons, lights, LEDs), which may be directly accessible via, or attached to, servers 105 or may be indirectly accessible via or attached to the user device 115. According to one aspect, an administrator or operator may access the servers 105 via the user device 115 to review information, make changes, input training data, initiate training via the MLTM 142, and/or perform other functions (e.g., operation of one or more trained models via the MLOM 144).

In one aspect, the computing modules 130 may include one or more NLP modules 148 comprising a set of computer-executable instructions implementing NLP, natural language understanding (NLU) and/or natural language generator (NLG) functionality. The NLP module 148 may be responsible for transforming the user input (e.g., unstructured conversational input such as speech or text) to an interpretable format. The NLP module 148 may include NLU processing to understand the intended meaning of utterances, among other things. The NLP module 148 may include NLG which may provide text summarization, machine translation, and/or dialog where structured data is transformed into natural conversational language (i.e., unstructured) for output to the user.

In one aspect, the computing modules 130 may include one or more chatbots and/or voice bots 150 which may be programmed to simulate human conversation, interact with users, understand their needs, and recommend an appropriate line of action with minimal and/or no human intervention, among other things. This may include providing the best response of any query that it receives and/or asking follow-up questions.

In some embodiments, the voice bots or chatbots 150 discussed herein may be configured to utilize AI and/or ML techniques, such as the ML chatbot 152. For instance, the ML chatbot 152 may be a large language model such as OpenAI GPT-4, Meta LLaMa, or Google PaML 2. The voice bot or chatbot 150 may employ supervised or unsupervised ML techniques, which may be followed by, and/or used in conjunction with, reinforced or reinforcement learning techniques. The voice bot or chatbot 150 and/or ML chatbot 152 may employ the techniques utilized for ChatGPT.

Noted above, in some embodiments, the ML chatbot 152 or other computing device may be configured to implement ML, such that server 105 "learns" to analyze, organize, and/or process data without being explicitly programmed. ML may be implemented through ML methods and algorithms ("ML methods and algorithms"). In one exemplary embodiment, the ML module 140 may be configured to implement ML methods and algorithms.

In one aspect, the computing modules 130 may include one or more generative AI/ML models 154 (generative ML model 154). The generative ML model 154 may enable a computer, such as the server 105, to use existing data (e.g., as an input and/or training data) such as text, audio, video, images, and/or code, among other things, to generate new content, such as text, audio, video, images, and/or code, among other things, via one or more models. The generative ML 154 may include unsupervised and semi-supervised ML algorithms, which may automatically discover and/or learn patterns in input data. Once trained, e.g., via MLTM 142, a generative ML model 154 may generate content as an output which plausibly may have been drawn from the original input dataset. In one aspect, ML chatbot 152 may include one or more generative ML models 154.

Some types of generative ML models 154 may include generative adversarial networks (GANs) and/or transformer-based models. In one aspect, the GAN may generate images, visual and/or multimedia content from image and/or text input data. The GAN may include a generative model (generator) and discriminative model (discriminator). The generative model may produce an image which may be evaluated by the discriminative model and use the evaluation to improve operation of the generative model. The transformer-based model may include a generative pre-trained language model. Other types of generative ML models 154 may use the GAN, the transformer model, and/or other types of models and/or algorithms to generate: (i) realistic images from sketches, which may include the sketch and object category as input to output a synthesized image; (ii) images from text, which may produce images (realistic, paintings, etc.) from textual description inputs; (iii) speech from text, which may use character or phoneme input sequences to produce speech/audio outputs; (iv) audio, which may convert audio signals to two-dimensional representations (spectrograms) which may be processed using algorithms to produced audio; (v) video, which may generate and convert video (i.e., a series of images) using image processing techniques and/or may include predicting what the next frame in the sequence of frames/video may look like and generate the predicted frame. With the appropriate algorithms and/or training, generative ML models 154 may produce various types of multimedia output and/or content.

The one or more servers 105 may also be in communication with one or more user devices 115, e.g., a user device associated with an employee of the enterprise and/or a customer of the enterprise. The user device 115 may comprises one or more computers, which may comprise multiple, redundant, or replicated client computers accessed by one or more users. The user device 115 may access services or other components of the computing environment 100 via the network 110. The user device 115 may be any suitable device and include one or more mobile devices, wearables, smart watches, smart contact lenses, smart glasses, AR glasses/headsets, VR glasses/headsets, mixed or extended reality glasses/headsets, voice bots or chatbots, ChatGPT bots, displays, display screens, visuals, and/or other electronic or electrical components. The user device 115 may include a memory and a processor for, respectively, storing and executing one or more modules. The memory may include one or more suitable storage media such as a magnetic storage device, a solid-state drive, random access memory (RAM), etc. The user device 115 may access services or other components of the computing environment 100 via the network 110, as further described herein.

In some embodiments, the computing environment 100, e.g., via server 105, may generate social media content for a user associated with an enterprise using ML. The server 105 may receive via network 110 a request for information from the user's user device 115. The server 105 may provide the request for the information to the ML chatbot 152.

The ML chatbot 152 may be trained via MLTM 142 using historical training data (e.g., past social media posts) which may be indicative of a style of communication associated with a user profile, such as vocabulary, phrasing, accent, tone, sentiment, conciseness, medium of communication, or other suitable styles of communication. The ML chatbot 152 may be trained to generate a response to the request based upon the user profile.

The ML chatbot 152 may be based upon a fine-tuned ML model. The server 105 may train a base ML model via MLTM 142 using historical enterprise data such as product information, contact information, office locations, hours of operation, and/or other suitable information associated with the enterprise. The server 105 may fine-tune the base ML model via MLTM 142 using training data associated with a plurality of user profiles to generate a plurality of fine-tuned ML models associated with the user profiles. The training data associated with a plurality of user profiles may include one or more of data indicative of a style of communication, data indicative of user attributes, historical social media posts, or any other data suitable to fine-tune an ML model for an associated user profile. One or more of the historical training data, historical enterprise data, user profile training data and/or user profiles may be stored in database 126 of server 105.

The server 105 may identify the fine-tuned ML model associated with the user profile of the user, load the identified fine-tuned ML model for the ML chatbot 152 into one or more memories, such as MLOM 144, for use as the ML chatbot 152, and generate the response to the user request as an output of the ML chatbot 152. The server 105 may obtain the output, and generate based upon the output, social media content via generative ML model 154, such as text, images, audio, video, multimedia, or any other suitable content. The server 105 may provide the social media content to the user device 115 via network 110. For example, a user's profile may indicate they work as sales representative in the furniture department of a retailer and prefer image-based social media posts. If the user request to the server 150 is to generate a social media post related to a sale at the retailer, the response provided may be an image that includes the name of the retailer, a graphic of a sofa, text that all items are on sale during the upcoming weekend with the contact information of the user, and an image of the user.

In some embodiments, the computing environment 100, e.g., via server 105, may provide information via the ML chatbot 152 in a style of communication which emulates the traits of a person. The server 105 may receive via network 110 a request for information from the user via user device 115. The server 105 may provide the request for the information to the ML chatbot 152.

The ML chatbot 152 may be trained to generate a response to the request in a style of communication emulating the traits of the person, traits such as vocabulary, phrasing, accent, tone, sentiment, conciseness, humor, and/or depth of knowledge. The ML chatbot 152 may be trained via MLTM 142 using historical training data indicative of the traits of the person, such as content (e.g., text, audio, video, etc.) created by the person emulated.

The ML chatbot 152 may be based upon a fine-tuned ML model. The server 105 may train a base ML model via MLTM 142 using historical base model training data which allows the trained ML chatbot 152 to respond to the request. For example, a museum (e.g., enterprise) may host/offer the ML chatbot 152 to provide tours to patrons, in which case the historical base model training data may be indicative of information of the museum itself, exhibits at the museum, other local attractions a patron may want to experience, or any other suitable data. The server 105 may fine-tune the base ML model via MLTM 142 based upon a plurality of training data associated with a plurality of persons having associated traits which the ML chatbot 152 may emulate. The base ML model fine-tuning may generate a plurality of fine-tuned ML models associated with the respective plurality of persons. The historical training data, historical base model data, and/or fine-tuned model training data may be stored in database 126 of server 105.

The server 105 may obtain an indication of the person which the ML chatbot 152 may emulate. In one aspect, this may include the server 105 generating a model selection interface which allows selection a person associated with fine-tuned ML models, such as via a graphical user interface (GUI), virtual models representing persons for selection (e.g., for display on a viewer device and/or in AR, VR and/or the metaverse). The server 105 may provide the model selection interface to the user device 115, and detect, via the model selection interface, the indication of the person to emulate. The response the ML chatbot 152 generates to the request may be based upon the indicated person.

The server 105 may obtain the output response of the ML chatbot 152, generate content based upon the output, and provide the content to the user device 115. In one aspect, the content may be related to a tour. In one example, the tour is an AR tour, the content is AR content, and the user device is an AR viewer device. In other examples, the tour may be a metaverse or VR tour experience where the user device a VR viewer, an audio-guided tour where the user device a smartphone, and/or any other suitable tour and/or corresponding user device.

In some embodiments, the computing environment 100, e.g., via server 105, may generate information using ML based upon detecting user interaction at a portal, e.g., via user device 115. The portal may include a website, a mobile application (mobile app), an interactive-voice response system, the metaverse, or any other suitable electronic, online, digital and/or virtual portal of an enterprise, among other things. The interaction may include one or more of entering text, a signal from an input device, visiting a hyperlink, uploading content, viewing content, interacting with the enterprise via the metaverse, or any other suitable user interaction at the portal by the user and/or user device 115.

The server 105 may receive a request for information from the user via the portal and provide the request for the information to an ML chatbot 152. The ML chatbot 152 may be trained, e.g., via MTLT 142, using historical training data to generate a response based upon the user's interaction at the portal. In one aspect, the ML chatbot 152 may be trained to prioritize one or more responses according to the response(s) which may be best-aligned with the user based upon their interactions at the portal. The historical training data may be indicative of historical user interactions of a plurality of historical users at the portal. The training data may be indicative of what customers need, what may be important to the marketplace of the enterprise, how to boost marketing for the enterprise, what questions a customer is comfortable asking an ML chatbot versus a human, and/or other suitable indications.

The server 105 may track one or more user interactions of the user at the portal. The server 105 may classify the user interaction data associated with the one or more user interactions to one or more particular types of user activity. User activity may include one or more of searching, an inquiry, requesting a quote, and/or submitting a claim (e.g., an insurance claim).

The server 105 may train a base ML model using the historical enterprise data as previously described. The server 105 may fine-tune the base ML model based upon a plurality of user profiles associated with a plurality of types of user activity at the portal to generate a plurality of fine-tuned ML models associated with the plurality of types of user activity. The server may identify a fine-tuned ML model associated with the particular type of user activity for the ML chatbot 152 and load the identified fine-tuned ML model for the ML chatbot 152 into the one or more memories, such as loading the fine-tuned ML model into MLOM 144 at runtime. The server 105 may obtain an output of the ML chatbot 152 that is responsive to the user request and provide the output to the user device. For example, if the user's request for information requests the kinds of insurance policies the enterprise may offer, and the user activity indicates the user was browsing the portal for, and/or entered search terms at the portal related to, insurance for a boat, the ML chatbot 152 may prioritize a response that includes specifically addressing insurance for boats.

Although the computing environment 100 is shown to include two user devices 115, one server 105, and one network 110, it should be understood that different numbers of user devices 115, networks 110, and/or servers 105 may be utilized. In one example, the computing environment 100 may include a plurality of servers 105 and/or hundreds or thousands of user devices 115, all of which may be interconnected via the network 110.

The computing environment 100 may include additional, fewer, and/or alternate components, and may be configured to perform additional, fewer, or alternate actions, including components/actions described herein. Although the computing environment 100 is shown in FIG. 1 as including one instance of various components such as user device 115, server 105, network 110, etc., various aspects include the computing environment 100 implementing any suitable number of any of the components shown in FIG. 1 and/or omitting any suitable ones of the components shown in FIG. 1. For instance, information described as being stored at server database 126 may be stored at memory 122, and therefore database 126 may be omitted. Moreover, various aspects include the computing environment 100 including any suitable additional component(s) not shown in FIG. 1, such as but not limited to the exemplary components described above. Furthermore, it should be appreciated that additional and/or alternative connections between components shown in FIG. 1 may be implemented. As just one example, server 105 and user device 115 may be connected via a direct communication link (not shown in FIG. 1) instead of, or in addition to, via network 110.

Exemplary Mobile Device

Figure 2:
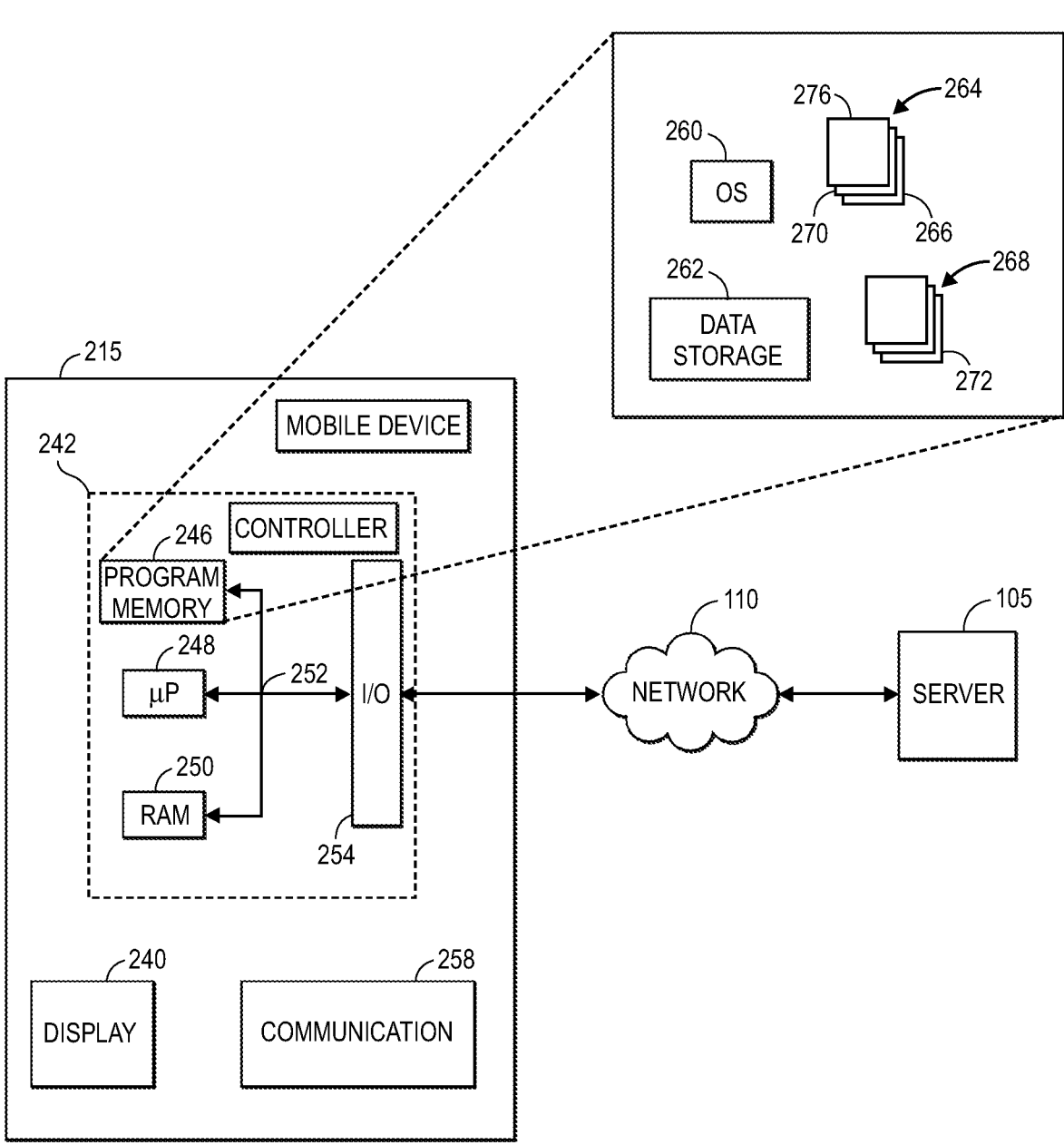
FIG. 2 depicts a block diagram of an exemplary mobile device in which computer-implemented methods and systems for fine-tuning ML chatbots for an enterprise are implemented, according to one embodiment.

Referring now to FIG. 2, in one embodiment the user device 115 may include a mobile device 215. The mobile device 215 may include a display 240, a communication unit 258, a user-input device (not shown), and a controller 242. The controller 242 may include a program memory 246, a microcontroller/processor/microprocessor (μP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include one of a plurality of mobile platforms such as the iOS®, or Android™, developed by Apple Inc. and Google Inc., respectively.

The data storage 262 may include data such as one or more user profiles (e.g., the user profile described herein), application data for the plurality of applications 264, routine data for the plurality of routines 268, and/or other data necessary to interact with the one or more servers 105 through the network 110. In some embodiments, the controller 242 may also include, or otherwise be communicatively connected to, other data storage mechanisms (e.g., one or more hard disk drives, optical storage drives, solid state storage devices, etc.) that reside within the mobile device 215.

The communication unit 258 may communicate with the one or more servers 105 via any suitable wireless communication protocol network, such as a wireless telephony network (e.g., GSM, CDMA, LTE, 5G, 6G, UWB etc.), a Wi-Fi network (802.11 standards), a WiMAX network, a Bluetooth network, etc. The user-input device (not shown) may include a "soft" keyboard that is displayed on the display 240 of the mobile device 215, an external hardware keyboard communicating via a wired and/or a wireless connection (e.g., a Bluetooth keyboard), an external mouse, a touchscreen, a stylus, and/or any other suitable user-input device.

As discussed with reference to the one or more servers 105, it should be appreciated that although FIG. 2 depicts only one microprocessor 248, the controller 242 may include multiple microprocessors 248. Similarly, the memory of the controller 242 may include multiple RAMs 250 and/or multiple program memories 246. Although FIG. 2 depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and/or configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the mobile device 215.

One of the plurality of applications 264 may be a native application and/or web browser 270, such as Apple's Safari®, Google Chrome™ mobile web browser, Microsoft Internet Explorer® for Mobile, Opera Mobile™, that may be implemented as a series of machine-readable instructions for receiving, interpreting, and/or displaying application screens or web page information from the one or more servers 105 while also receiving inputs from the user. Another application of the plurality of applications may include an embedded web browser 276 that may be implemented as a series of machine-readable instructions for receiving, interpreting, and/or displaying web page information.

In one aspect, a user may launch a client application 266 from a client device, such as one of the user devices 115, to communicate with the one or more servers 105. In one example, the client application 266 may provide tours, receive social media content, and/or act as a portal to an enterprise. Additionally, the user may also launch or instantiate any other suitable user interface application (e.g., the native application or web browser 270, and/or any other one of the plurality of software applications 264) to access the one or more servers 105 to realize aspects of the inventive system.

One of the plurality of routines may include an audio-guided tour routine 272 that may display information associated with a tour based upon the location of the mobile device 215. In some embodiments, the audio-guided tour routine 272 may launch automatically upon receiving a signal indicating the location of the mobile device 215.

The mobile device 215 may include additional, fewer, and/or alternate components, and may be configured to perform additional, fewer, or alternate actions, including components/actions described herein. Although the mobile device 215 is shown in FIG. 2 as including one instance of various components such as display 240, processor 248, etc., various aspects include the mobile device 215 implementing any suitable number of any of the components shown in FIG. 2 and/or omitting any suitable ones of the components shown in FIG. 2. Moreover, various aspects include the mobile device 215 including any suitable additional component(s) not shown in FIG. 2, such as but not limited to the exemplary components described above. Furthermore, it should be appreciated that additional and/or alternative connections between components shown in FIG. 2 may be implemented.

Exemplary AR Device

Figure 3A:
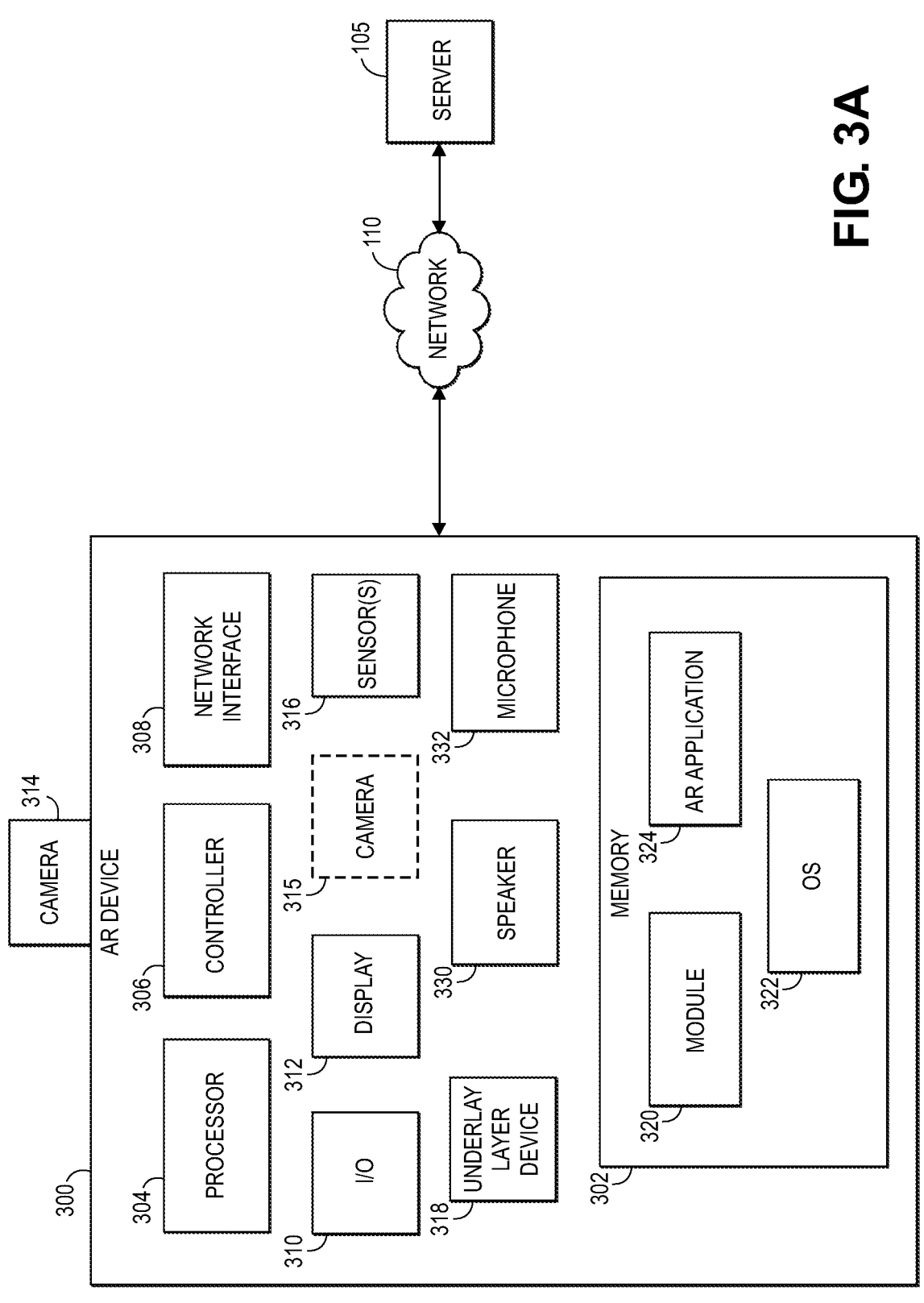
FIG. 3A depicts a block diagram of an exemplary AR device in which computer-implemented methods and systems for fine-tuning ML chatbots for an enterprise are implemented, according to one embodiment.

Referring now to FIG. 3A, in one embodiment the user device 115 may include an AR viewer device 300. The AR viewer device 300 may be, for example, a smartphone, tablet device, laptop computer, electronic contact lenses, a projector, glasses, googles, a headset such as the Google Glass, Microsoft HoloLens, Oculus Quest, Apple Vision Pro, Meta Reality, and/or other suitable computer device.

The AR viewer device 300 may include a memory 302, a processor (CPU) 304, a controller 306, a network interface 308, an I/O 310, a display 312, cameras 314, 315, sensors 316, an underlay layer device 318, a speaker 330 and/or a microphone 332.

The memory 302 may include one or more memories, such as a non-transitory, computer readable memory comprising computer-executable instructions that, when executed, cause the AR viewer device 300 to perform actions thereof described in this description (e.g., via the processor 304, controller 306, display 312 and/or other components of the AR viewer device 300). The memory 302 may comprise one or more memory modules 320 such a random-access memory (RAM), read-only memory (ROM), flash memory, a hard disk drive (HDD), a solid-state drive (SSD), flash memory, MicroSD cards, and/or other types of suitable memory.

The memory 302 may store an operating system (OS) 322 (e.g., Microsoft Windows Mixed Reality Platform, Glass OS, Android, VisionOS, etc.) capable of facilitating the functionalities, applications, methods, or other software as discussed herein. Memory 302 may also store one or more applications to, e.g., for fine-tuning an ML chatbot. In one embodiment, memory 302 may store an AR application 324 which may, among other things, present AR displays (also referred to, or including, virtual configurations) to the display 312 of AR viewer device 300 as described in more detail herein.

Additionally, or alternatively, the memory 302 may store data from various sources, e.g., AR displays, virtual models, virtual configurations, overlay layer data, floorplans, structure information, property information, plumbing information, as well as any other suitable data.

The processor 304 may include one or more local or remote processors, which may be of general-purpose or specific-purpose. In some embodiments this may include one or more microprocessors, ASICs, FPGAs, systems-on-chip (SoCs), systems-in-package (SiPs), graphics processing units (GPUs), well as any other suitable types of processors. During operation, the processor 304 may execute instructions stored in the program memory module 302 coupled to the processor 304 via a system bus of a controller 306.

The AR viewer device 300 may further include the controller 306. The controller 306 may receive, process, generate, transmit, and/or store data and may include and/or be operably connected to (e.g., via the system bus) the memory 302, the processor 304, and/or the I/O 310, as well as any other suitable components.

The AR viewer device 300 may further include a network interface 308, which may facilitate communications to and/or from the AR viewer device 300 with one or more devices and/or networks, such as the server 105 via network 110. The network interface 308 may include one or more transceivers and/or modems, and may facilitate any suitable wired or wireless communication, standard or technology, such as GSM, CDMA, TDMA, WCDMA, LTE, EDGE, OFDM, GPRS, EV-DO, UWB, 3G, 4G, 5G, 6G, IEEE 802 including Ethernet, WiMAX, Wi-Fi, Bluetooth, and/or other suitable communication.

The I/O 310 (i.e., one or more input and/or output units) may include, interface with and/or be operably connected to, for example, one or more input devices such as a touchpad, a touchscreen, a keyboard, a mouse, a camera 314, 315, underlay layer device 318, and/or microphone 332, as well as one or more output devices such as a display 312, a speaker 330, a haptic/vibration device, and/or other suitable input and/or output devices. In some embodiments, the I/O 310 may include one or more peripheral I/O devices, such as a peripheral display, microphone 332, camera 314, 315, sensors 316 and/or other interface devices operably connected to the AR viewer device 300 (e.g., via a wired or wireless connection) via the I/O 310. Although FIG. 3A depicts the I/O 310 as a single block, the I/O 310 may include a number of different I/O circuits, busses and/or modules, which may be configured for I/O operations.

One or more cameras 314, 315 may capture still and/or video images of the physical environment of the AR viewer device 300. The cameras 314, 315 may include digital cameras, such as charge-coupled devices, to detect electromagnetic radiation in the visual range or other wavelengths. In some embodiments, as depicted in FIG. 3A, one or more interior cameras 315 may be located on the interior of the AR viewer device 300, e.g., for tracking the eyes of the user via OS 322 and/or AR application 324. The AR viewer device 300 may include one or more exterior cameras 314 located on the exterior of AR viewer device 300, e.g., for user hand tracking, object identification, and/or localization within the physical environment via OS 322 and/or AR application 324. In other embodiments, one or more of the cameras (not shown) may be external to, and operably connected with (e.g., via I/O 310, Bluetooth and/or Wi-Fi) the AR viewer device 300. The captured images may be used to generate AR displays, virtual configurations, augmented environments, and the like. In some embodiments, two or more cameras, such as external cameras 314, may be disposed to obtain stereoscopic images of the physical environment, thereby better enabling the AR viewer device 300 to generate virtual space representations of the physical environment, and/or overlay augmented information onto the physical environment.

The display 312, along with other integrated or operably connected devices, may present augmented and/or virtual information to a user of the AR viewer device 300, such as an AR display or virtual configuration. The display 312 may include any known or hereafter developed visual or tactile display technology, including LCD, LED, OLED, AMO-LED, a projection display, a haptic display, a holographic display, or other types of displays. In some embodiments, the display 312 may include dual and/or stereoscopic displays, e.g., one for presenting content to the left eye and another for presenting content to the right eye. In some embodiments, the display 312 may be transparent allowing the user to see the physical environment around them, e.g., for implementing AR techniques in which an AR display may be overlaid on the physical environment.

According to one embodiment of FIG. 3A, the AR viewer device 300 may present one or more AR displays via the display 312. For example, the display 312 may be a surface positioned in a line of sight of the wearer of the AR viewer device 300. Accordingly, the AR viewer device 300 may be configured to overlay augmented information included in the AR display onto features of the physical environment within the line of sight of the wearer of the AR viewer device 300. To determine the line of sight of the wearer, the AR viewer device 300 may include an image sensor (such as an external camera 314 and/or underlay layer device 318) configured to have a field of view that generally aligns with the line of the sight of the wearer. In one embodiment, the AR viewer device 300 may be configured to route the image data to the server 105 to generate an AR display that includes information related to objects within the line of sight of the wearer. For example, the server 105 may include one or more object classification models configured to identify one or more objects within the received image data and provide the classification data back to the AR viewer device to present an AR display that includes at least a portion of the classification data.

The AR viewer device 300 may further include one or more sensors 316. In some embodiments, additional local and/or remote sensors 316 may be communicatively connected to the AR viewer device 300. The sensors 316 may include any devices or components mentioned herein, other devices suitable for capturing data regarding the physical environment, and/or later-developed devices that may be configured to provide data regarding the physical environment (including components of structures or objects within the physical environment).

Exemplary sensors 316 of the AR viewer device 300 may include one or more accelerometers, gyroscopes, inertial measurement units (IMUs), GPS units, proximity sensors, cameras 314, 315 microphones 332, as well as any other suitable sensors. Additionally, other types of currently available or later-developed sensors may be included in some embodiments. One or more sensors 316 of the AR viewer device 300 may be configured for localization, eye/hand/head/movement tracking, geolocation, object recognition, computer vision, photography, positioning and/or spatial orientation of the device, as well as other suitable purposes. The sensors 316 may provide sensor data regarding the local physical environment which may be used to generate a corresponding AR display, as described herein, among other things.

AR viewer device 300 may further include underlay layer device 318 configured to generate underlay layer data from the field of view of the wearer. As will be described elsewhere herein, the underlay layer data may be analyzed to create the AR display. In one illustrative example, the underlay layer device 318 may be camera, such as camera 314, coupled to the AR viewer device 300 in a manner such that the camera has a field of view that generally aligns with the field of view of a user of the AR viewer device 300. As used herein, the word "camera" should be understood to include a camera that records one or both of images and/or video data. In certain embodiments where the AR viewer device 300 is a phone or a tablet, the underlay layer data device 318 may be built into the AR viewer device 300. In some embodiments where the AR viewer device 300 is worn by the user, the underlay layer data device 318 may be fixedly attached to the AR viewer device 300.

In one embodiment, the AR viewer device 300 or other device may process data from one or more sensors 316 to generate a semi-virtual environment. For example, data from one or more sensors 316, such as cameras 314, 315, underlay layer device 318, accelerometers, gyroscopes, IMUs, etc., may be processed, e.g., at the server 105 and/or at the AR viewer device 300, which may include AR application 324, to determine aspects of the physical environment which may include object recognition, the orientation and/or localization of the AR viewer device 300, the field of view of the user, among other things. In one embodiment, the sensor data may be combined with image data generated by the cameras 314, 315 and/or underlay layer device 318 to present AR displays via the display 312 of the AR viewer device 300 using the AR application 324, which may include displaying and/or overlaying images, models, instructions, animations, video, multimedia and/or other digitally-generated content onto the physical environment via the display 312.

The AR viewer device 300 may include one or more speakers 330 configured to emit sounds and one or more microphones 332 configured to detect sounds. The one or more speakers 330 and/or microphones 332 may be disposed on the AR viewer device 300 and/or remotely from, and operably connected to, the AR viewer device 300, e.g., via a wire and/or wirelessly. In one embodiment, the speaker 330 and/or microphone 332 may be configured to provide multimedia effects in conjunction with an AR display, receive voice commands e.g., to control the AR viewer device 300, among other things.

In one embodiment, AR viewer device 300 may receive and/or access overlay layer data (e.g., data stored in a database, such as the database 126) to create the AR display. The overlay layer data may be correlated (e.g., on the server 105) with the underlay layer data (e.g., from the underlay layer device 318) to create the AR display. For example, a server 105 may have access overlay layer data associated with a venue in which the user is located, such as a museum. The AR viewer device 300 and/or server 105 may process the underlay layer data generated via underlay layer data device 318, data from sensors 316 such as locations via a GPS sensor, orientation data from an orientation sensor and/or the venue overlay layer data.

The AR viewer device 300 and/or server 105 may correlate the overlay layer data, underlay layer data and/or sensor data to generate an AR display, identify the location of the AR viewer device 300, and/or any other suitable purpose. For example, the AR display may identify the room of the museum the user is in, objects in the field of view of the user such as artifacts, artwork and/or other items on display within the museum, information regarding the various exhibits, guidance information to travel through the museum, and/or other suitable information.

In some embodiments, the AR viewer device 300 may be a personal electronic device, such as a smartphone or tablet. For example, the personal electronic device may be configured to execute the AR application 324 in which a rear-facing camera captures image data of the physical environment proximate to the AR viewer device 300 and overlays AR data onto the front-facing display 312. Accordingly, in these embodiments, the functionality of the AR viewer device 300 and/or the personal electronic device may be integrated at a single device.

In other embodiments, the AR viewer device 300 may include a base unit coupled to an AR viewer. For example, the base unit may be integrally formed with the AR viewer, such as in a frame that supports the display 312.

In other embodiments, the base unit and the AR viewer are physically separate and in wireless communication (e.g., via Bluetooth, Wi-Fi, or other short-range communication protocol) or wired communication with one another. In these embodiments, both the base unit and the AR viewer may include local versions of the components described with respect to the AR viewer device 300. For example, both the base unit and the AR viewer may include respective memories 302, processors 304, controllers 306, network interfaces 308, and/or sensors 316. Accordingly, the respective memories 302 may include respective versions of the AR application 324 that coordinate the execution of the functionality described herein between the AR viewer and the base unit.

Generally, the AR application 324 may utilize the components of the base unit to perform the more processor-intensive functionality described with respect to the AR viewer device 300. For example, the base unit may be configured to process sensor data, wirelessly communicate with the server 105, create AR displays, etc. On the other hand, the AR application 324 may utilize the components of the viewer device to transmit sensor data to present AR displays via the display 312.

The AR viewer device 300 may include a power source (not shown), such as a rechargeable battery pack. The power source may be integral to the AR viewer device 300 and/or may be a separate power source within the base unit and operably connected to the AR viewer device 300.

The AR viewer device 300 may include additional, fewer, and/or alternate components, and may be configured to perform additional, fewer, or alternate actions, including components/actions described herein. Although the AR viewer device 300 is shown in FIG. 3A as including one instance of various components such as processor 304, underlay layer device 318 etc., various aspects include the AR viewer device 300 implementing any suitable number of any of the components shown in FIG. 3A and/or omitting any suitable ones of the components shown in FIG. 3A. Moreover, various aspects include the AR viewer device 300 including any suitable additional component(s) not shown in FIG. 3A, such as but not limited to the exemplary components described above. Furthermore, it should be appreciated that additional and/or alternative connections between components shown in FIG. 3A may be implemented.

Exemplary VR Device

Figure 3B:
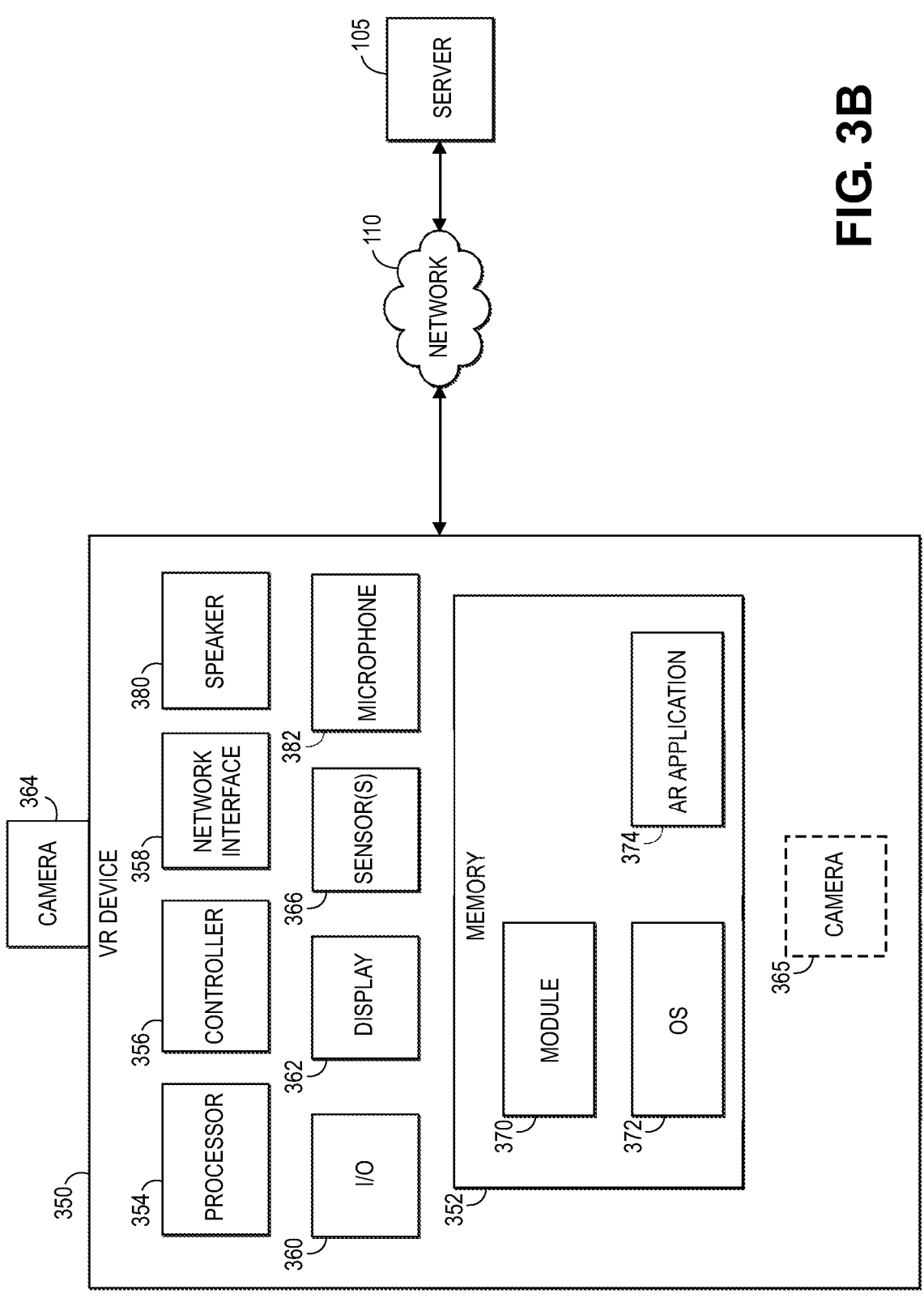
FIG. 3B depicts a block diagram of an exemplary VR device in which computer-implemented methods and systems for fine-tuning ML chatbots for an enterprise are implemented, according to one embodiment.

Referring now to FIG. 3B, in one embodiment the user device 115 may include a VR viewer device 350. The VR viewer device 350 may be a smartphone, tablet device, laptop computer, a projector, a headset such as the Oculus Rift, the Apple Vision Pro, Microsoft HoloLens, Meta Reality, and/or another suitable computer device.

The VR viewer device 350 may include a memory 352, a processor (CPU) 354, and a controller 356. The VR viewer device 350 may further include a network interface 358, an I/O 360, a speaker 380 and/or a microphone 382. In some embodiments, components 352, 354, 356, 358, 360, 380 and 382 are configured to operate in the manner described above with respect to components 302, 304, 306, 308, 310, 330 and 332, respectively.

The memory 352 may store an operating system (OS) 372 (e.g., Microsoft Windows Mixed Reality Platform, Glass OS, Android, VisionOS, etc.) capable of facilitating the functionalities, applications, methods, or other software as discussed herein. In one embodiment, the memory 352 may store a VR application 376 which may present virtual configurations to VR viewer device 350. VR application 376 functionality may include analyzing data from one or more sensors 366, obtaining and/or generating virtual configurations, images, models, instructions, animations, video, audio, multimedia and/or other digitally-generated content (e.g., from a database on a server), presenting virtual configurations on the display 362 of the VR viewer device 350, and/or providing interaction between the user and a virtual configuration, as well as any other suitable VR functionality.

The VR viewer device 350 may include one or more displays 362. Along with other integrated or operably connected devices, the display 362 may present simulated and/or virtual environments to a user via a virtual configuration. The display 362 may include any known or hereafter developed visual or tactile display technology, including LCD, LED, OLED, AMOLED, a projection display, a haptic display, a holographic display, or other types of displays. In some embodiments, the display 362 may include dual and/or stereoscopic displays, e.g., one presenting content to the left eye and another presenting content to the right eye. In some embodiments, the display 362 may encompass the user's entire field of view such that the user is unable to see the physical environment around them creating an immersive, entirely virtual environment for the user.

The VR viewer device 350 may further include one or more cameras 364, 365 which may capture still and/or video images of the user and/or physical environment. The one or more cameras 364, 365 may include digital cameras, stereoscopic cameras, and/or other similar devices, such as charge-coupled devices, to detect electromagnetic radiation in the visual range or other wavelengths. In some embodiments as depicted in FIG. 3B, one or more cameras may be an interior camera 365 located on the interior of the VR viewer device 350 such as for eye tracking. In some embodiments, one or more cameras may be an exterior camera 364 located on the exterior of VR viewer device 350 such as for hand tracking, localization within the physical environment, detecting objects in the physical environment e.g., which the user may unknowingly collide with due to the immersive nature of the display 312 to provide a warning, among other things. In other embodiments, one or more cameras may be external to, and operably connected with, the VR viewer device 350 (e.g., via I/O 360, Bluetooth and/or Wi-Fi).

The VR viewer device 350 may also include one or more sensors 366. The sensors 366 may include any devices or components described herein, other devices suitable for capturing data regarding a physical environment, and/or later-developed devices that may be configured to provide data regarding a physical environment (including components of structures or objects within the physical environment). The sensors 366 may be intended for localization, eye/hand/head/movement tracking, geolocation, object recognition, computer vision, photography, positioning and/or spatial orientation of the device, as well as other suitable purposes.

Exemplary sensors 366 of the VR viewer device 350 may include one or more accelerometers, gyroscopes, inertial measurement units (IMUs), GPS units, proximity sensors, cameras 364, 365, microphones, 382, as well as any other suitable sensors. Additionally, other types of currently available or later-developed sensors may be included in some embodiments. In one embodiment, the VR viewer device 350 may process data from one or more sensors 366 to generate an immersive, completely virtual environment for the user, which may include VR application 374 presenting the virtual configuration via the display 362 of VR viewer device 350. For example, the virtual configuration may include the interior of virtual vehicle and the VR viewer device 350 may use data from accelerometers, gyroscopes, IMUs to track the user's head movements so they may look around the virtual vehicle interior from various angles and points of view.

The VR viewer device 350 of FIG. 3B may similarly include a base unit and power source (not shown) coupled to the VR viewer device 350. The base unit may perform many of the functions described herein, as well as those explicitly described above similar to the AR device 300 base unit, such as creating the virtual configuration. The base unit may include other components, such as a processor, controller and/or sensors. Similar to the AR device 300, in some embodiments, the base unit may be part of the VR viewer, and in other embodiments the base unit may be separate from, but operably connected to (e.g., wirelessly or wired), the VR viewer such that the VR viewer may remain lightweight and comfortable for long-term use by the user. The present discussion assumes the base unit is integral and part of the VR viewer of VR viewer device 350, unless otherwise described.

The VR viewer device 350 may include additional, fewer, and/or alternate components, and may be configured to perform additional, fewer, or alternate actions, including components/actions described herein. Although the VR viewer device 350 is shown in FIG. 3B as including one instance of various components such as processor 354, cameras 364, 365 etc., various aspects include the VR viewer device 350 implementing any suitable number of any of the components shown in FIG. 3B and/or omitting any suitable ones of the components shown in FIG. 3B. Moreover, various aspects include the VR viewer device 350 including any suitable additional component(s) not shown in FIG. 3B, such as but not limited to the exemplary components described above. Furthermore, it should be appreciated that additional and/or alternative connections between components shown in FIG. 3B may be implemented.

Exemplary Training of the ML Chatbot Model

Programmable chatbots, such the chatbot 150 and/or the ML chatbot 152, may provide tailored, conversational-like abilities when interacting with a user. The chatbot may be capable of understanding user requests/responses, providing relevant information, etc. Additionally, the chatbot may generate data from user interactions which the enterprise may use to personalize future support and/or improve the chatbot's functionality, e.g., when retraining and/or fine-tuning the chatbot.

The ML chatbot may provide advance features as compared to a non-ML chatbot, which may include, and/or derive functionality from, a large language model (LLM). The ML chatbot may be trained on a server, such as server 105, using large training datasets of text which may provide sophisticated capability for natural-language tasks, such as answering questions and/or holding conversations. The ML chatbot may include a general-purpose pretrained LLM which, when provided with a starting set of words (prompt) as an input, may attempt to provide an output (response) of the most likely set of words that follow from the input. In one aspect, the prompt may be provided to, and/or the response received from, the ML chatbot and/or any other ML model, via a user interface of the server. This may include a user interface device operably connected to the server via an I/O module, such as the I/O module 146. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user utterances and/or prompts, which may require the ML chatbot to keep track of an entire conversation history as well as the current state of the conversation. The ML chatbot may rely on various techniques to engage in conversations with users, which may include the use of short-term and long-term memory. Short-term memory may temporarily store information (e.g., in the memory 122 of the server 105) that may be required for immediate use and may keep track of the current state of the conversation and/or to understand the user's latest input in order to generate an appropriate response. Long-term memory may include persistent storage of information (e.g., on database 126 of the server 105) which may be accessed over an extended period of time. The long-term memory may be used by the ML chatbot to store information about the user (e.g., preferences, chat history, etc.) and may be useful for improving an overall user experience by enabling the ML chatbot to personalize and/or provide more informed responses.

The system and methods to generate and/or train an ML chatbot model (e.g., via the ML module 140 of the server 105) which may be used by the ML chatbot, may consist of three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy.

Supervised Fine-Tuning ML Model

Figure 4:
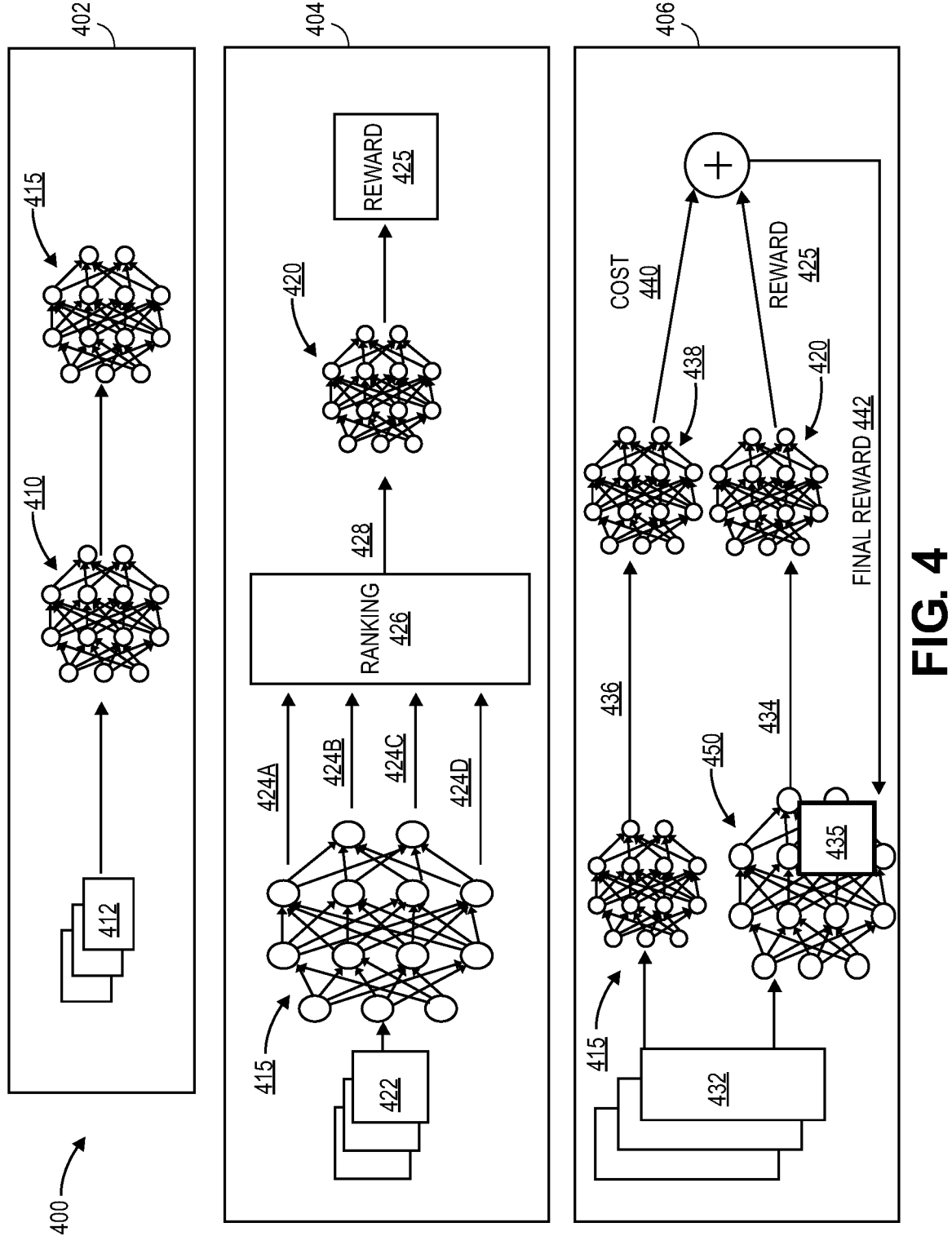
FIG. 4 depicts a combined block and logic diagram in which exemplary computer-implemented methods and systems for training an ML chatbot model are implemented, according to one embodiment.

FIG. 4 depicts a combined block and logic diagram 400 for training an ML chatbot model, in which the techniques described herein may be implemented, according to some embodiments. Some of the blocks in FIG. 4 may represent hardware and/or software components, other blocks may represent data structures or memory storing these data structures, registers, or state variables (e.g., data structures for training data 412), and other blocks may represent output data (e.g., 425). Input and/or output signals may be represented by arrows labeled with corresponding signal names and/or other identifiers. The methods and systems may include one or more servers 402, 404, 406, such as the server 105 of FIG. 1.

In one aspect, the server 402 may fine-tune a pretrained language model 410. The pretrained language model 410 may be obtained by the server 402 and be stored in a memory, such as memory 122 and/or database 126. The pretrained language model 410 may be loaded into an ML training module, such as MLTL 142, by the server 402 for retraining/fine-tuning. A supervised training dataset 412 may be used to fine-tune the pretrained language model 410 wherein each data input prompt to the pretrained language model 410 may have a known output response for the pretrained language model 410 to learn from. The supervised training dataset 412 may be stored in a memory of the server 402, e.g., the memory 122 or the database 126. In one aspect, the data labelers may create the supervised training dataset 412 prompts and appropriate responses. The pretrained language model 410 may be fine-tuned using the supervised training dataset 412 resulting in the SFT ML model 415 which may provide appropriate responses to user prompts once trained. The trained SFT ML model 415 may be stored in a memory of the server 402, e.g., memory 122 and/or database 126.

In one embodiment, the SFT ML model 410 may be fine-tuned based upon one or more user profiles, e.g., to emulate the person and/or user associated with the user profile. In one aspect, the user profile may be of a person associated with an enterprise, such as an employee, and contain information such as the department the employee works in, their role at the enterprise, types of content the user generates, language they use in the generated content, etc.). The trained SFT ML model 410 may generate an output in a style of communication associated with the user of the user of the user profile, such as specific vocabulary, phrasing, accent (if audio output), tone, sentiment, conciseness, etc., In one aspect, the SFT ML model 410 may be fine-tuned to generate responses in a style of communication emulating a person's traits, such as knowledge, humor and style of communication. In one aspect, the person may be a tour guide, a celebrity, a brand ambassador, etc.

In one aspect, the supervised training dataset 412 may include prompts and responses which may be relevant for emulating a person. In one embodiment, a user prompt may include a request for information relating to an enterprise from an employee of the enterprise. Appropriate responses from the trained SFT ML model 415 may include a response which fulfils the request and is also provided in the style of a particular person, as described herein.

Training the Reward Model

In one aspect, training the ML chatbot model 450 may include the server 404 training a reward model 420 to provide as an output a scaler value/reward 425. The reward model 420 may be required to leverage reinforcement learning with human feedback (RLHF) in which a model (e.g., ML chatbot model 450) learns to produce outputs which maximize its reward 425, and in doing so may provide responses which are better aligned to user prompts.

Training the reward model 420 may include the server 404 providing a single prompt 422 to the SFT ML model 415 as an input. The input prompt 422 may be provided via an input device (e.g., a keyboard) via the I/O module of the server, such as I/O module 146. The prompt 422 may be previously unknown to the SFT ML model 415, e.g., the labelers may generate new prompt data, the prompt 422 may include testing data stored on database 126, and/or any other suitable prompt data. The SFT ML model 415 may generate multiple, different output responses 424A, 424B, 424C, 424D to the single prompt 422. The server 404 may output the responses 424A, 424B, 424C, 424D via an I/O module (e.g., I/O module 146) to a user interface device, such as a display (e.g., as text responses), a speaker (e.g., as audio/voice responses), and/or any other suitable manner of output of the responses 424A, 424B, 424C, 424D for review by the data labelers.

The data labelers may provide feedback via the server 404 on the responses 424A. 424B, 424C. 424D when ranking 426 them from best to worst based upon the prompt-response pairs. The data labelers may rank 426 the responses 424A, 424B, 424C, 424D by labeling the associated data. The ranked prompt-response pairs 428 may be used to train the reward model 420. In one aspect, the server 404 may load the reward model 420 via the ML module (e.g., the ML module 140) and train the reward model 420 using the ranked response pairs 428 as input. The reward model 420 may provide as an output the scalar reward 425.

In one aspect, the scalar reward 425 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 420 may generate a winning reward. Inputting a "losing" prompt-response pair data to the same reward model 420 may generate a losing reward. The reward model 420 and/or scalar reward 436 may be updated based upon labelers ranking 426 additional prompt-response pairs generated in response to additional prompts 422.

In one example, a data labeler may provide to the SFT ML model 415 as an input prompt 422, "Describe the sky." The input may be provided by the labeler via the user device 102 over network 110 to the server 404 running a chatbot application utilizing the SFT ML model 415. The SFT ML model 415 may provide as output responses to the labeler via the user device 102: (i) "the sky is above" 424A; (ii) "the sky includes the atmosphere and may be considered a place between the ground and outer space" 424B; and (iii) "the sky is heavenly" 424C. The data labeler may rank 426, via labeling the prompt-response pairs, prompt-response pair 422/424B as the most preferred answer; prompt-response pair 422/424A as a less preferred answer; and prompt-response 422/424C as the least preferred answer. The labeler may rank 426 the prompt-response pair data in any suitable manner. The ranked prompt-response pairs 428 may be provided to the reward model 420 to generate the scalar reward 425.

While the reward model 420 may provide the scalar reward 425 as an output, the reward model 420 may not generate a response (e.g., text). Rather, the scalar reward 425 may be used by a version of the SFT ML model 415 to generate more accurate responses to prompts, i.e., the SFT model 415 may generate the response such as text to the prompt, and the reward model 420 may receive the response to generate a scalar reward 425 of how well humans perceive it. Reinforcement learning may optimize the SFT model 415 with respect to the reward model 420 which may realize the configured ML chatbot model 450.

RLHF to Train the ML Chatbot Model

In one aspect, the server 406 may train the ML chatbot model 450 (e.g., via the ML module 140) to generate a response 434 to a random, new and/or previously unknown user prompt 432. To generate the response 434, the ML chatbot model 450 may use a policy 435 (e.g., algorithm) which it learns during training of the reward model 420, and in doing so may advance from the SFT model 415 to the ML chatbot model 450. The policy 435 may represent a strategy that the ML chatbot model 450 learns to maximize its reward 425. As discussed herein, based upon prompt-response pairs, a human labeler may continuously provide feedback to assist in determining how well the ML chatbot's 450 responses match expected responses to determine rewards 425. The rewards 425 may feed back into the ML chatbot model 450 to evolve the policy 435. Therefore, the policy 435 may adjust the parameters of the ML chatbot model 450 based upon the rewards 425 it receives for generating good responses. The policy 435 may update as the ML chatbot model 450 provides responses 434 to additional prompts 432.

In one aspect, the response 434 of the ML chatbot model 450 using the policy 435 based upon the reward 425 may be compared using a cost function 438 to the SFT ML model 415 (which may not use a policy) response 436 of the same prompt 432. The server 406 may compute a cost 440 based upon the cost function 438 of the responses 434, 436. The cost 440 may reduce the distance between the responses 434, 436, i.e., a statistical distance measuring how one probability distribution is different from a second, in one aspect the response 434 of the ML chatbot model 450 versus the response 436 of the SFT model 415. Using the cost 440 to reduce the distance between the responses 434, 436 may avoid a server over-optimizing the reward model 420 and deviating too drastically from the human-intended/preferred response. Without the cost 440, the ML chatbot model 450 optimizations may result in generating responses 434 which are unreasonable but may still result in the reward model 420 outputting a high reward 425.

In one aspect, the responses 434 of the ML chatbot model 450 using the current policy 435 may be passed by the server 406 to the rewards model 420, which may return the scalar reward or discount 425. The ML chatbot model 450 response 434 may be compared via cost function 438 to the SFT ML model 415 response 436 by the server 406 to compute the cost 440. The server 406 may generate a final reward 442 which may include the scalar reward 425 offset and/or restricted by the cost 440. The final reward or discount 442 may be provided by the server 406 to the ML chatbot model 450 and may update the policy 435, which in turn may improve the functionality of the ML chatbot model 450.

To optimize the ML chatbot 450 over time, RLHF via the human labeler feedback may continue ranking 426 responses of the ML chatbot model 450 versus outputs of earlier/other versions of the SFT ML model 415, i.e., providing positive or negative rewards or adjustments 425. The RLHF may allow the servers (e.g., servers 404, 406) to continue iteratively updating the reward model 420 and/or the policy 435. As a result, the ML chatbot model 450 may be retrained and/or fine-tuned based upon the human feedback via the RLHF process, and throughout continuing conversations may become increasingly efficient.

Although multiple servers 402, 404, 406 are depicted in the exemplary block and logic diagram 400, each providing one of the three steps of the overall ML chatbot model 450 training, fewer and/or additional servers may be utilized and/or may provide the one or more steps of the ML chatbot model 450 training. In one aspect, one server may provide the entire ML chatbot model 450 training.

Generative ML

In one aspect, a computing environment such as computing environment 100 and/or a server such as server 105 may use generative ML models such as generative ML model 154 to generate content such as audio, images, video, slides (e.g., a PowerPoint slide), virtual reality models/content, augmented reality models/content, mixed reality models/content, multimedia, blockchain entries, metaverse content, social media content, and/or any other suitable content.

In one embodiment, the generative ML model may be trained to produce images in a two-stage process. In a first stage, a text encoder and an image encoder may be trained on training data of image-text pairs. During training, the ML model receives a list of images and a corresponding list of captions describing the images. Using the data, the encoders may be trained to map the image-text pairs to a vector space whose dimensions represent both features of images and features of the text. This shared vector space may provide the ML model with the ability to translate between text and images and understand how the text maps and/or relates to images based upon the image-text pairs. Through training, the ML model may learn the features of the image, such as objects present in the image, the aesthetic style, the colors and materials, etc.

In one aspect, in the second stage the ML model may generate images from scratch based upon a text input using a diffusion model which learns to generate an image by reversing a gradual noising process. The second stage text input may describe the image to be generated from which the diffusion model may generate the image. During training, the ML model may receive a corrupted, noisy version of the image it is trained to reconstruct as a clean image. This model may be trained to reverse the mapping learned in the first stage via the image encoder, to fill in the necessary details when reversing the noising process to produce a realistic image from the noisy image.

In one embodiment, the transformer-based model, such as that discussed herein with respect to training the ML chatbot 450, may operate on sequences of pixels rather than sequences of text alone, to generate images.

In one embodiment, an ML chatbot may be trained to include functionality of a generative ML model, such as being trained to operate on inputs which may include both image pixels as well as text to produce realistic-looking images based upon short captions. The short captions may specify multiple objects, their colors, textures, respective positions, and other contextual details such as lighting or camera angle. In such an example, once trained, the ML chatbot which includes on one more generative ML models such as those described may be able to receive one or more user prompts and in response, generate audio content (e.g., audio/voice/speech), written content (e.g., text), visual content (e.g., images, drawings, slides), multimedia content (e.g., video, slides), virtual content (e.g., augmented reality content, virtual reality content, metaverse content), and/or other suitable content.

Exemplary ML Model Training

Figure 5:
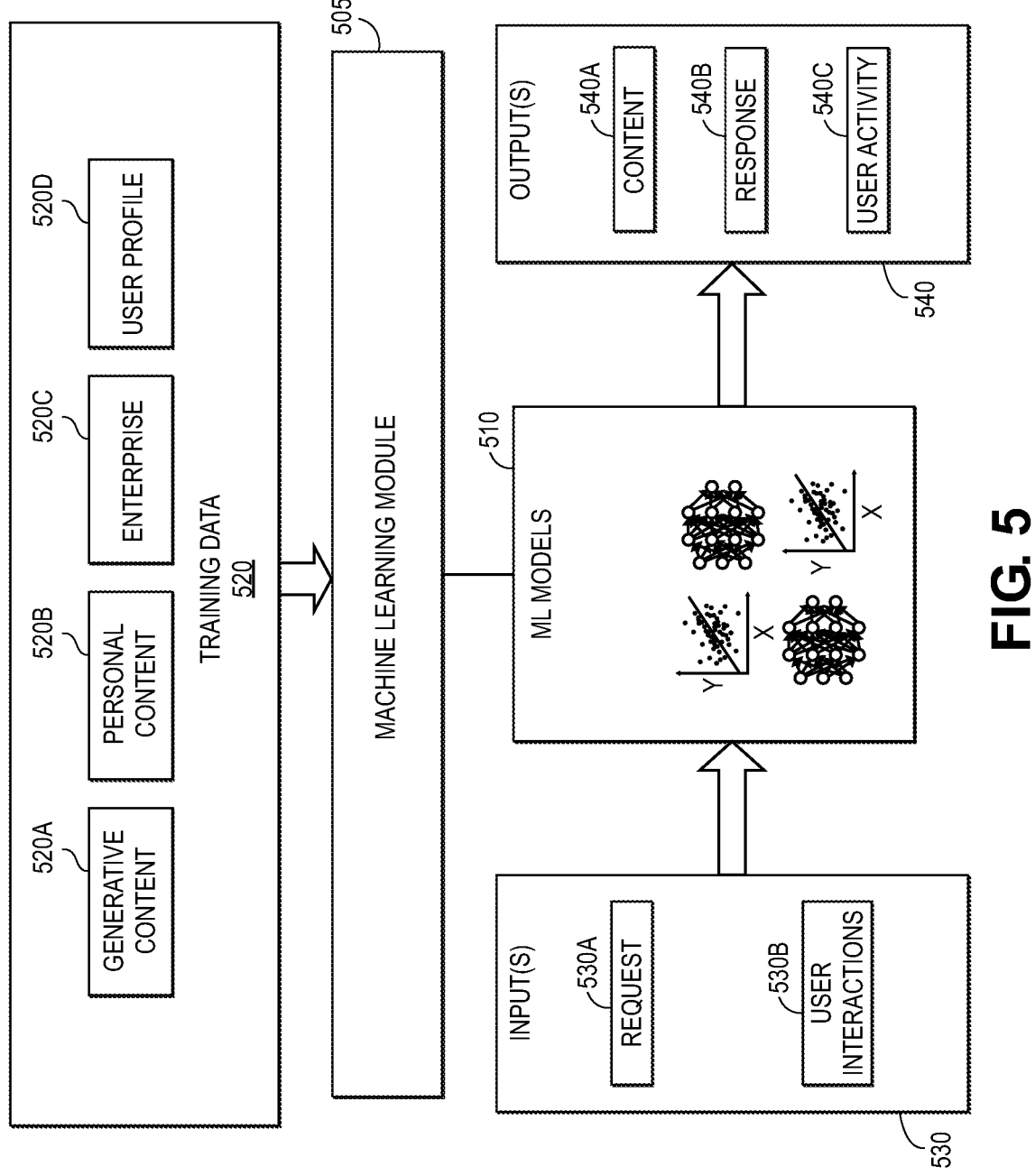
FIG. 5 depicts a combined block and logic diagram in which exemplary computer-implemented methods and systems for generating content using ML are implemented, according to one embodiment.

FIG. 5 schematically illustrates how an enterprise server, such as server 105, may train one or more ML models, such as ML models 152, 154, to provide a response to a request such as a request for information and associated response including generating content such as social media content, content associated with a tour, marketing content, multimedia content, content emulating a person, etc., according to one embodiment. Some of the blocks in FIG. 5 may represent hardware and/or software components (e.g., block 505), other blocks may represent data structures or memory storing these data structures, registers, or state variables (e.g., block 520), and other blocks may represent output data (e.g., block 540).

In one aspect, the ML module 505 may include one or more hardware and/or software components such as ML module 140, MLTM 142, MLOM 144. The ML module 505 may obtain, create, train, retrain, fine-tune, retrieve, load, operate and/or save one or more ML models 510, such as generative ML model 154 and/or ML chatbot 152, 450.

The ML module 505 may use training data 520 to generate, train, retrain and/or fine-tune the one or more ML models 510. The server may save the training data 520 in a memory, such as the memory 122 and/or the database 126 of the server 105, and/or update the training data 520 at one or more times. In one aspect, the training data 520 may include generative training data 520A such as images, text, phenomes, audio or other types of data for training one or more generative AI/ML models such as generative ML model 154. In one aspect, the training data 520 may include personal content 520B such as written content (e.g., historical blog posts, social media posts, articles, journal entries, etc.), audio content (e.g., historical voice messages, audio associated with video, a podcast, etc.), and/or image content (e.g., photographs, videos, mems, GIFs, etc.). In one aspect, the personal content 520B may be indicative of a style, attributes and/or traits of a person, and may allow the trained ML model 510 to generate responses, information, content and/or other output 540 which emulates the person. In one aspect, the training data 520 may include enterprise data 520C related to an enterprise, such as hours of operation, locations, contact information, products offered, brand identity (fonts, logos, emblems, slogans, messaging considerations, etc.). The enterprise data may allow the trained ML model 510 to generate responses, information and/or content associated with the enterprise as an output 540. In one aspect, the training data 520 may include user profile data 520D which may include and/or indicate for a person and/or user associated with the user profile a role of a user at the enterprise, personal content of the user, user activity at a portal, etc., or any other suitable data associated with a person and/or user. The training data 520 may include any data relevant to training an ML model 510 to generate information and/or content as an output 540. While the exemplary training data 520 includes indications of various types of data, this is merely an example for ease of illustration only.

In one aspect, the ML module 505 may load the training data 520, e.g., using an MLTM such as MLTM 142, to train one or more ML models 510 to generate an output 540 based upon receiving an input 530. The ML module 505 may store the trained ML model 510 in a memory, such as memory 122 and/or the database 126 of the server 105.

In one aspect, the ML model 510 includes a generative ML model which receives an input 530 such as a request for information 530A, and is trained to generate content 540A as an output 540, such as social media content, tour content, marketing content, etc. The ML model 510 may include one or more AI/ML models and/or algorithms (e.g., SFT ML model, GAN, pre-trained language models, supervised learning, unsupervised learning, semi-supervised learning, and/or reinforcement learning, etc.) as described herein to generate the content 540A as the output 540.

In one aspect, the ML model 510 includes an ML chatbot such as ML chatbot 152s. The ML model 510 may receive as an input 530 a request 530A, e.g., a request for information from a user. The ML model 510 may be trained to generate as an output 540 a response 540B such as verbal, audible, and/or textual response to the request. In one aspect, the ML chatbot may generate as an output 540 a response 540B based upon one or more user interactions at a portal, wherein the response may include content 540A, such as marketing content.

In one aspect, the ML model 510 may include an ML chatbot and generative ML model trained to generate as an output 540 any kind of output which the ML chatbot and/or the generative ML model may provide as an output 540 individually, and/or other suitable output 540. For example, the ML chatbot may receive an input 530 a request 530A, such as a request for information, a request to generate social media content, and/or any other request. In response, the ML chatbot may generate as an output 540 a response 540B, such as a response in which emulates a person (e.g., the person's style, traits, etc.). The response 540B may be provided as an input 530 to a generative ML model. The output 540 of the generative ML model may be content 540B, such as social media content, content associated with a tour, or any other suitable content.

In one aspect, the ML model 510 is a classification model. The classification ML model 510 may receive as an input 530 data indicating user interactions at a portal 530B. The classification model may be trained to generate as an output 540 a type of user activity 540C associated with the user interaction. The ML model 510 may receive other types of suitable inputs 530 to generate associated suitable outputs 540 according to the training of the ML model 510.

The ML module 505 may use training data 520 to retrain and/or fine-tune one or more ML models 510. Retraining may include the process of training a model based upon new data, whereas fine-tuning may include adding and/or adjusting the parameters (e.g., weights, layers) of a previously trained model based upon data (e.g., specific data, new data, a user profile), although for the purposes of discussion herein, the terms training, retraining and/or fine-tuning may be used interchangeably. In one example, an ML model 510 may be retrained based upon updated training data 520 or any other suitable data. In one example, an ML model 510 may be fine-tuned based upon user profile data 520D, other training data 520 associated with traits of a person, and/or any other suitable data.

In one aspect, the training data 520 may be updated at one or more times with new data. For example, training data 520 may include enterprise data 520C which is updated to include new data, such as for new products offered by the enterprise, new locations of the enterprise, and/or any other suitable data. The ML module 505 may retrain an ML model 510 with the updated enterprise data 520C so that it may consider the new products, locations, etc., when generating an output 540.

In one aspect, the ML model 510 may be an ML chatbot based upon a fine-tuned model. For example, a base ML model may be trained using training data 520 which includes enterprise data 540D. The base ML model may be trained to generate as an output 540 data associated with an enterprise. The base ML model may be fined-tuned via the ML module 505 using training data 520 such as personal content 520B generated by a person. In one example, the person may be associated with a user profile, such as an employee of an enterprise, a celebrity, a tour guide and/or other suitable personality. In one aspect, the fine-tuned ML model may be able to provide as an output 540 content 540A which emulates the person. This may include emulating the vocabulary, phrasing, accent, tone, sentiment, conciseness, humor, depth of knowledge, and/or medium of communication of the person, as well as any other suitable output 540.

In one aspect, the fine-tuned ML model may be able to provide as an output 540 data which is based upon user interactions (e.g., stored in a user profile 520D) and/or user activity (e.g., as an output 540C of a classification model) at a portal. For example, the fine-tuned ML model may generate an output 540 including marketing content 540A and/or responses 540B tailored to a specific user and based upon their interactions at the portal.

In one example, an employee of a fitness center (e.g., enterprise) may use an application on a computer (e.g., user device 115) to submit a request 530A to an ML model 510 such as an ML chatbot. The request 530A may be to generate social media content 540A for a spin class the fitness center offers. The ML chatbot 510 may generate a response 540B indicating the dates, times, and instructors of the spin class. The ML chatbot output 540B may be provided as an input 530 to an ML model 510, such as a fine-tuned generative ML model. The fine-tuned generative ML model may output generative content 540A which may include graphics of a stationary bike, text indicating the dates, times, and instructors of the spin class, fonts and logos associated with the fitness center, as well as message including text and emojis in the style of the fitness center employee making the request. The employee may receive the generative content 540A at their computer, and post the content 540A to their social media account to promote the spin class.

At a later date, the fitness center employee may want to advertise a new class the fitness center plans to offer to generate interest for attendance. The new class may be a kickboxing class taught but a newly hired instructor. The training data 520 may be updated with new data associated with the new kickboxing class (e.g., times, location, etc.), data associated with the new instructor (e.g., a user profile of the new instructor), data indicative of the content, style and/or traits of the new instructor, or any other suitable data. The updated training data 520 may be used to retrain one or more ML models 510, such that the retrained ML model 510 may be able to output responses 540B, content 540A, and/or any other suitable output 540 associated with the new kickboxing class and/or new instructor.

Exemplary Computer System for Generating Social Media Content for a User

Figure 6:
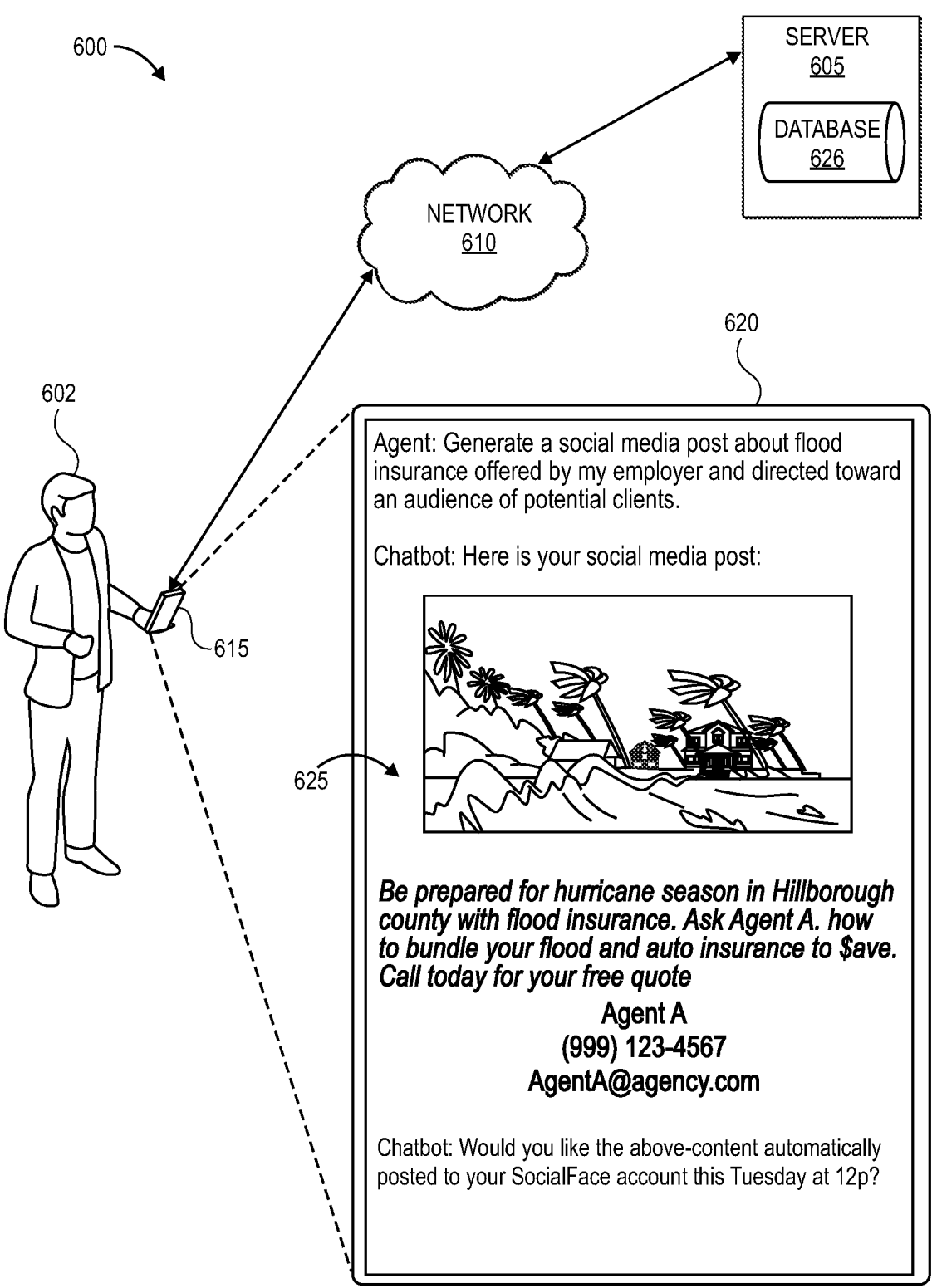
FIG. 6 depicts a block diagram of an exemplary computer system for generating social media content using ML, according to one embodiment.

FIG. 6 depicts a block diagram of an exemplary computer system 600 for generating social media content for an agent, Agent A. (Agent) 602, associated with an enterprise using ML, according to an embodiment. The computer system may include a smartphone 615, a network 610, and/or a server 605, such as the user device 115, the network 110 and/or the server 105 of FIG. 1, respectively. The server 605 may include one or more ML models, e.g., an ML chatbot such as the ML chatbot 152, 450, a generative ML model such as generative ML model 154, and/or an ML model fine-tuned to Agent 602. The system may include additional, less, or alternate devices, including those discussed elsewhere herein.

In the illustrated scenario, Agent 602 would like to post social media content to advertise an insurance product they sell. The insurance carrier that employs Agent 602 may want the social media content to abide by certain messaging considerations, such as messaging consistent with a corporate image, brand identity, appropriate subject matter, tone, vocabulary, and/or styling such as fonts, logos, trademarks, colors, slogans, etc., and/or other suitable messaging considerations. A base ML model, such as one used by an ML chatbot, may be trained using historical enterprise data and/or other training data which allows the ML chatbot to generate content according to messaging considerations of the insurance carrier, among other things.

In one aspect, Agent 602 may want the social media post to have certain messaging considerations, such as content related to their role at the insurance carrier (e.g., products they sell, their target demographic(s), preferred market location, their contact information), content created in their personal style (e.g., vocabulary, phrasing, accent, tone, sentiment, conciseness, and/or medium of communication), and/or other suitable messing considerations. An ML model, such as an ML chatbot based upon a fine-tuned ML model of the base ML model, may be fine-tuned using user profile data, personal data, and/or other suitable training data associated with Agent 602. The fine-tuned ML model may allow the ML chatbot to generate output (responses, generative content, etc.) according to the messaging considerations of Agent 602.

Agent 602 may have an enterprise mobile app of the insurance carrier on their smartphone 615. Agent 602 may load the mobile app and login using their credentials. The login credentials may be associated with user profile data for Agent 602, which may be stored on the database 626 of server 605. The user profile data, or other data stored and/or available to the server 605 associated with Agent 602, may indicate the Agent 602 is a sales representative for the insurance carrier, sells various types of insurance including flood insurance, has an office located in Tampa, Florida, and generally services clients within Hillsborough County Florida, among other things.

While the mobile app is running, Agent 602 may speak (e.g., into a microphone), type (e.g., via keypad and/or touchscreen) and/or otherwise input via their smartphone 615 a request for an ML model on the server 605. For example, if using voice input, Agent 602 may speak an input for an ML chatbot on the server 605 via the mobile app when stating, "Generate a social media post about flood insurance offered by my employer and directed toward an audience of my potential clients." The mobile app may generate data indicative of the Agent's request, which may include displaying the request on the display 620 of the smartphone 615, e.g., for Agent 602 to visualize their interactions with the ML chatbot. The smartphone 615 may transmit Agent's request data to the server 605 via network 610.

The server 605 may provide Agent's request data as an input to the ML chatbot trained to generate a response to Agent's request. The ML chatbot may be based upon an ML model which is fine-tuned for the Agent 602. For example, the server 605 may identify the Agent's fine-tuned ML model based upon the user profile of the Agent 602, e.g., the user profile associated with Agent's login credentials for the mobile app. Once identified, the server 605 may load the Agent's fined-tuned ML model for the ML chatbot. The ML chatbot and/or other ML model of the server 605 may be trained to generate social media 625 in response to the Agent's request. The social media content 625 may include an image of a hurricane with text in a preferred font of the insurance carrier, which references Hillsborough county (i.e., a target market of the Agent 602), spells "save" as "$ave" which Agent 602 has historically done when creating social media content for work, and provides Agent's contact information. These characteristics of the social media content 625 allow it to emulate both messaging consistent with the enterprise as well as Agent 602.

In one example, the ML chatbot may ask Agent 602 if they would like to have the social media content 625 automatically posted to a social media account. This may include posting to an account, and/or at a time and date which may be preferred by the enterprise and/or Agent 602, according to messaging considerations of either.

It should be appreciated that while in the scenario depicted in FIG. 6 Agent 602 requests for the social media post to be generated by the ML model, in other scenarios, the insurance carrier may generate the request on behalf of Agent 602. For example, the insurance carrier may roll out a regional marketing strategy and request that the LLM and/or other ML model(s) generate one or more social media post in the style of each agent within the region. The LLM and/or other ML model(s) may then push the resultant posts to the respective agents for posting to their social media accounts.

Exemplary Computer System for Generating Information while Emulating a Person

Figure 7:
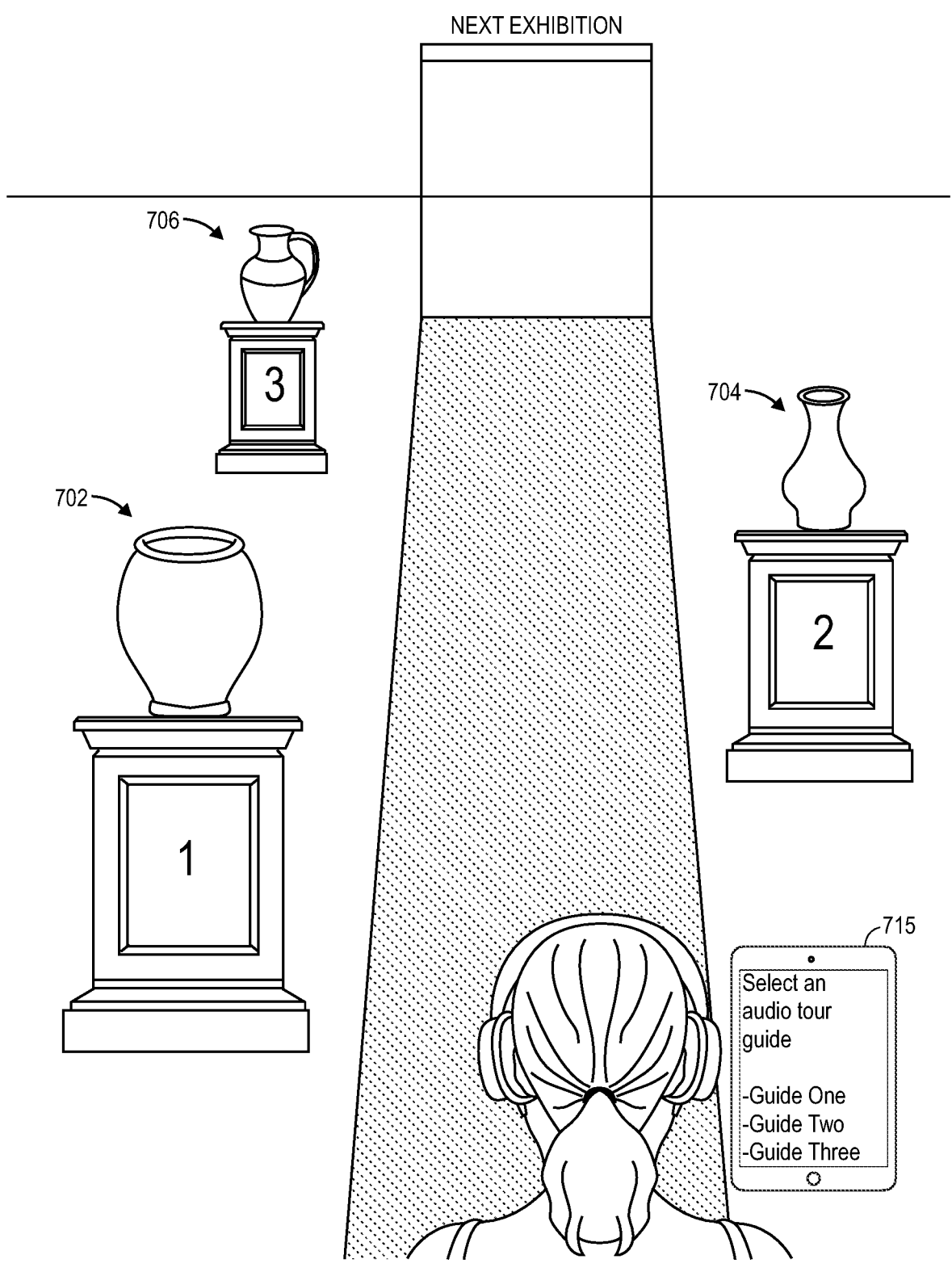
FIG. 7 depicts a block diagram of an exemplary audio-guided tour of an exhibit for a visitor of a museum.

FIG. 7 depicts a block diagram of an exemplary audio-guided tour of an exhibit for a visitor of a museum. A server such as server 105 may include an ML chatbot such as ML chatbot 152, a generative ML model such as generative ML model 154, any combination thereof, as well as any other suitable ML model such as ML model 510, allowing the server to generate the tour content, e.g., tour content which emulates a tour guide.

The museum visitor may load a mobile app on a tablet 715 such as devices 115, 215, to access an ML chatbot and/or experience the tour content. The visitor may request the ML chatbot generate an audio-guided tour of the exhibit they would like to experience at the museum. In one aspect, the visitor may provide via the app an indication of a tour guide or other personality they would like the tour content to emulate. The tour guide may be associated with a fine-tuned ML model which the ML chatbot may load, e.g., when generating or otherwise providing the tour content. For example, the mobile app may offer the museum visitor a model selection interface including options of tour guides (or underlying fine-tuned ML models of the tour guides) which the tour content may emulate. This may include a GUI presenting options of potential tour guides to the visitor, however other suitable manners of providing the selection interface of persons and/or fine-tuned ML models may be used. The visitor may select a tour guide from the GUI via the tablet 715, e.g., by tapping on the depiction of the tour guide they would like to select.

As previously described, an ML chatbot may be based upon a fine-tuned ML model of a base ML model. The fine-tuned model of the ML chatbot may be based upon a base ML model trained on enterprise data such as enterprise data associated with the museum, e.g., allowing the ML chatbot to respond to visitor questions related to the museum, among other things. The ML chatbot may load the fine-tuned ML model associated with the tour guide selected by the visitor. The fine-tuned ML model may be trained on data indicative of traits and/or a style of communication of the tour guide to allow the content generated by the trained fine-tuned ML model to emulate the tour guide. The training data may include personal content created by the tour guide, such as written content, audio content, image content, video content, and/or any other suitable content created by the tour guide. As a result, the trained ML chatbot and/or other ML model using the fine-tuned ML model may generate responses and/or content emulating the tour guide, e.g., audio video, multimedia, etc., having a vocabulary, phrasing, accent, tone, sentiment, conciseness, humor, and/or depth of knowledge which emulates the tour guide, or any other suitable characteristic of the tour guide. For example, a visitor may be visiting the Louvre museum for the second time. During their first visit, the visitor may have had a tour guide who, along with a French accent, had an exceptional depth of knowledge of the artwork at the museum. The Louvre tour guide may be unavailable during the visitor's second visit, and the visitor may request the ML chatbot generate tour content emulating the Louvre tour guide. Accordingly, the tour content the ML chatbot generates may include audio-guided tour content in a voice speaking with French accent and sounding similar to the Louvre tour guide, and which emulates the depth of knowledge of the Louvre tour guide.

During a tour, the server may identify the location of the visitor e.g., based upon location information being provided to the server by the tablet 715 using locating mechanisms such as GPS, ultra-wideband, triangulation, etc.; based upon biometric recognition of the visitor such as facial recognition of the visitor via a camera proximate an exhibit which transmits associated data to the server; or any other suitable manner of identifying the location of the visitor. The tour content may be location-based, e.g., specific content may be associated with the location of an object of interest, the location of the visitor and/or their tablet 715. In one aspect, the tour content may be provided to the visitor via the tablet 715 as they traverse the museum and arrive at associated content locations, e.g., in a real-time manner. This may allow the visitor to experience content associated with whatever portion of the exhibit they are nearby when receiving the tour content.

According to the example of FIG. 7, the visitor experiencing the location-based audio-guided tour may approach the first exhibit 702. As they approach, their tablet 715 may indicate to the server that the visitor is near the first exhibit 702. In response, the server via the ML chatbot may generate audio-guided tour content in the style of a tour guide the visitor previously selected, and provide the tour content associated with the first exhibit 702 to the tablet 715 as the visitor approaches the first exhibit 702. The tablet 715 may then determine that the visitor is moving from the first exhibit 702 to a second exhibit 704. As the visitor begins to approach the second exhibit 704, the ML chatbot may similarly generate and/or provide to the tablet 715 content associated with the second exhibit 704, and likewise as the visitor moves from the second exhibit 704 to a third exhibit 706. This may allow the visitor to experience the exhibit with a virtual tour guide of the location-based audio-guided tour content.

In one embodiment, the server may provide a tour which is experienced by the visitor on a viewer device, such as a viewer device 300, 350, allowing the user to experience the tour in AR and/or VR respectively. In such an embodiment, the server may generate tour content including one or more virtual models, virtual configurations, virtual content, etc. The AR and/or VR tour may include identifying one or more objects of interest, such as objects of interest within the user's field of view (e.g., using object recognition), objects of interest identified by the user to the ML chatbot (e.g., via the user's spoken input to the ML chatbot), and/or any other suitable manner. The server may obtain and/or generate virtual content, virtual models, overlay data, virtual configurations, and the like associated with the object of interest. For example, during an AR tour of an art exhibit, a piece of artwork may be within the field of view of the visitor. The server may obtain information associated with the artist who painted the piece of artwork and transmit the information to the viewer device, allowing the viewer device display to overlay the information as a virtual configuration in the field of view of the user while they view the artwork.

If a VR tour, the server may obtain a virtual model of an object of interest, such as a piece of artwork within an exhibit at a museum. The server may transmit the virtual model of the artwork to the VR viewer device, allowing the VR viewer device to display the virtual artwork model to the viewer. The VR viewer device may similarly obtain and/or generate virtual models and/or virtual configurations which create a virtual environment emulating the museum in which the artwork is exhibited, allowing the user to experience an immersive virtual exhibit. As with the audio-guided tour, the server may provide AR and/or VR tour content which emulates a person, such as a tour guide. For example, the user of an AR or VR viewer may experience audio of a virtual tour guide in a voice emulating a tour guide the user has selected. In one aspect, the virtual tour content may include a virtual model of the person who is being emulated.

In one embodiment, the tour may be a tour the user experiences in the metaverse via a viewer device such as viewer device 350. The ML chatbot may be capable of obtaining and/or generating metaverse content associated with the tour, similar to the audio-guided, AR, and/or VR tours described herein. For example, the user may be able to control the metaverse experience via one or more requests to the ML chatbot, such as having the ML chatbot create metaverse content, control metaverse interactions, and the like.

Exemplary Computer System for Providing Information Based Upon User Interaction at a Portal In one embodiment, a server of a system, such as the server 105 of environment 100, uses ML to provide information based upon one or more user interactions and/or user requests at a portal of an enterprise. The portal, which may be hosted by the server, may include one or more of a website, a mobile application, an interactive-voice response (IVR) system, an interaction with the metaverse (e.g., virtually visiting a storefront of the enterprise in the metaverse), and/or any other suitable online portal.

The user may access the portal via a user device, such as devices 115, 215, 300, 350. The user may have interactions at the portal which may include one or more of entering text (e.g., a request to an ML chatbot, a search query, login information), a signal from an input device (e.g., a mouse input such as a click, a keyboard input such as activating a physical and/or virtual key on a physical and/or virtual keyboard respectively), visiting a hyperlink, uploading content, detecting a dual-tone multi-frequency (DTMF) selection or spoken request in an IVR system, or any other suitable interaction. In one aspect, the user may be accessing the portal to request information, such as information associated with the enterprise of the portal.

The user may submit, and/or the server may receive, the request for information at the portal via the user device. For example, the server may host an ML chatbot such as ML chatbot 152 which the user may interact with via the portal. The user may provide the request for information via the user device to the ML chatbot of the portal. The ML chatbot may be trained using training data indicative of historical user interactions of a plurality of historical users at the portal. Once trained, the ML chatbot may generate a response to the user request based upon the interactions of the user at the portal, generate a response which is prioritized over other responses based upon the user interactions, and/or the like. The sever may provide the response to the user device, e.g., via a network such as network 110.

The ML chatbot be based upon a fine-tuned ML model of a base ML model. The base ML model may include a base ML model trained using historical enterprise data, such as the historical enterprise data previously described. The server, e.g., via an ML module such as ML module 140, may fine-tune the base ML model to generate a plurality of fine-tuned ML models based upon a plurality of user profiles associated with a plurality of types of user activity at the portal. The system may store the plurality of fine-tuned ML models associated with the plurality of types of user activity in a memory such as memory 122 and/or database 126 of the server.

The server may track the one or more user interactions at the portal and/or classify the user interactions to a particular type of user activity. The user interactions may include and/or generate data which is used for tracking the user activity, such as a cookie, click tracking data, scrolling data, browsing history data, session data, and/or any other suitable manner of tracking a user and/or user activity at a portal. In one aspect, the system may track the user via a user identifier, such as login credentials, an account number, etc.; via an identifier of their user device, such as an IP address, a MAC address, an international mobile equipment identity (IMEI), a mobile equipment identifier (MEID), an electronic serial number (ESN), an international mobile subscriber identity (IMSI); or any other suitable manner of tracking the user, user activity and/or user interactions.

In one aspect, the server may input or otherwise provide the user interaction data to a classification model trained to output a type of user activity based upon the user interaction data. The user activity may include searching, an inquiry, requesting a quote for products/services, and/or submitting a claim such as an insurance claim. The system, e.g., via the server, may identify a fine-tuned ML model associated with the particular type of user activity, and load the identified fine-tuned ML model for the ML chatbot into the one or more memories. This may allow the ML chatbot to generate output, content, responses and the like based upon the classified user activity. For example, if it appears the user may be searching the enterprise portal for information related to filing an insurance claim, the ML chatbot may generate questions required to file an insurance claim, provide the questions to the user, receive responses from the user, and generate a claim form with the information from their responses which the user may file with their insurance provider.

In one aspect, the system may analyze a user profile associated with the user of the portal to generate marketing content, a response to a request such as a request for information, and/or other suitable content. The user activity classification, user interactions, and/or any other data may be indicated by the user profile. For example, the user profile may indicate the user has conducted searches and browsed pages at the enterprise related to a product offered by the enterprise, such as automobile insurance coverage. The system may generate marketing content which includes automobile insurance pricing and agents located near the user based upon a user address associated with the user profile, available discounts based upon other products/services the user may be purchasing from the enterprise, and/or other marketing content. The user profile may further indicate the age and type of automobile of the user, such that the marketing content may be tailored and/or customized to the user based upon the user profile information. In one aspect, to generate the marking content, the system may input the request for the marketing content into the ML chatbot and obtain an output of the ML chatbot that includes the marketing content.

Figure 8:
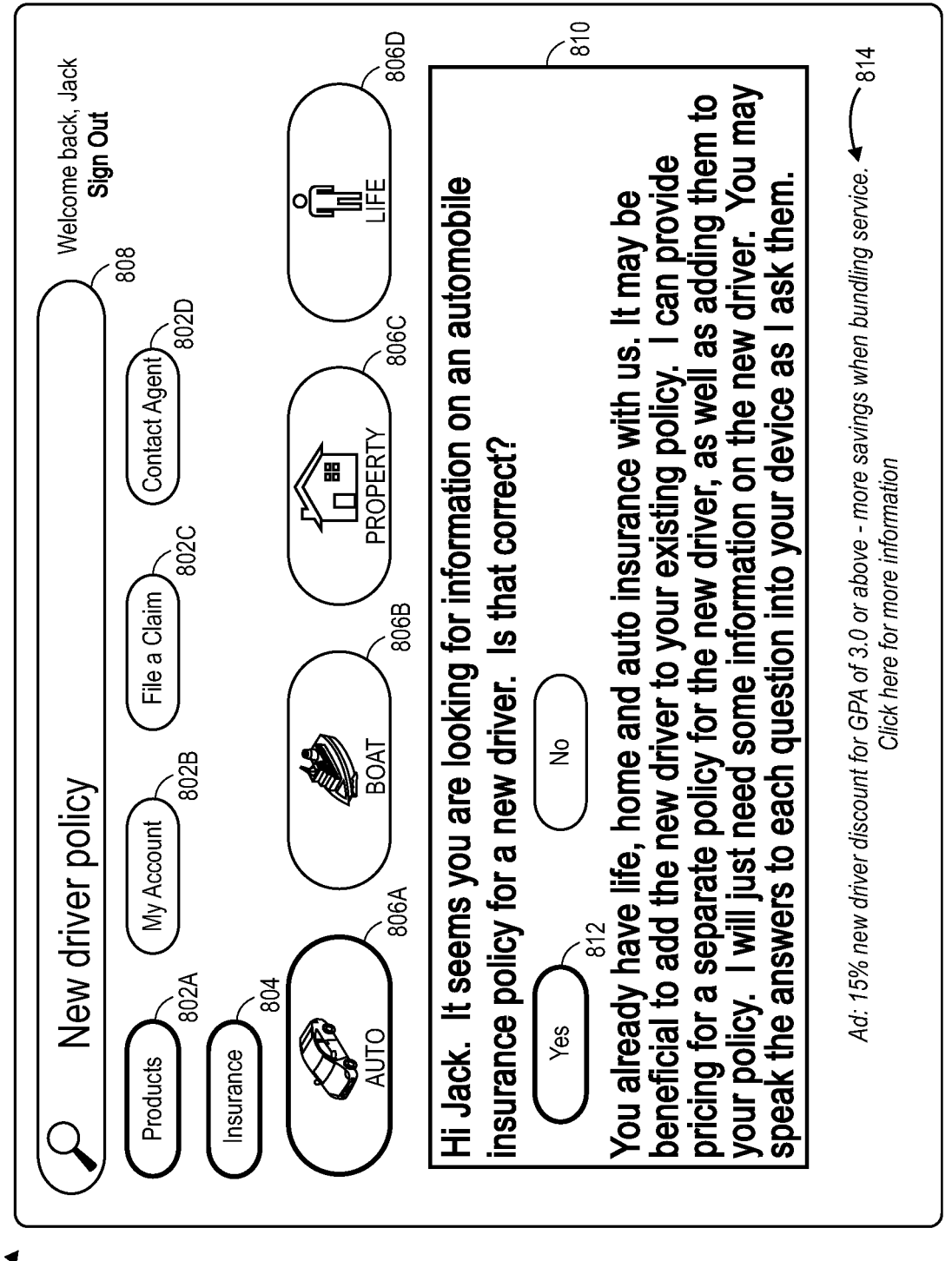
FIG. 8 depicts an exemplary display of information ML generates based upon one or more user interactions and/or user requests at a portal.

FIG. 8 depicts a display 800 of a laptop, such as user device 115, which Jack is using to browse a website (e.g., via a web browser) of his insurance provider as he looks for information on new driver automobile insurance for his child. When arriving at the website, Jack logs into his account using his account credentials. Once logged in, the website serves Jack a webpage having several icons 802A, 802B, 802C, 802D associated with various links to services and/or information of his insurance carrier. Jack selects the "Products" icon 802A by clicking on the icon 802A with a mouse of the laptop, and then similarly selects the "Insurance" icon 804 to arrive at a webpage with icons/links to information for automobile insurance 806A, boat insurance 806B, property insurance 806C and life insurance 806D. While at the webpage for automobile insurance as a result of clicking the icon/link 806A, Jack uses the laptop keyboard to type the phrase "New driver policy" into the search box 808.

Jack provides several user interactions while at the website, such as logging into his account using his login credentials, selecting icons 802A, 804, 806A to navigate to a page associated with automobile insurance, and entering search terms in search box 808. The server hosting the webpage, such as server 105, may track Jack's user inter-actions, e.g., tracking the pages visited using cookies, identifying and saving his activity data via the user profile associated with his login credentials, tracking session data of the web browser Jack uses to visit the webpage, and/or any other suitable manner of tracking Jack's interactions.

One or more of Jack's interactions at the website may be considered a request for information, such as searching via the search box 808, browsing the webpages, or other user activity. While Jack is visiting the website, the website may present a chatbot window 810 in which an ML chatbot such as ML chatbot 152 may accept requests from, and/or provide responses to Jack. Based upon his user activity, the server via one or more ML models may determine Jack's user interactions correlate with user activity classified as searching for information on a new driver automobile insurance policy. The ML chatbot may generate information requesting Jack confirm via icon 812 he is searching for such information, which may also be considered a request for information.

The server may classify the data Jack generates via his user interactions at the website as one or more user activities. In one aspect, user interaction data may be input into a classification model trained to output a type of user activity. In one aspect, one or more of the user interaction data, user activity data, and/or other data generated by a user at the portal may be saved to their user profile, e.g., in database 126 on server 105. The server may identify a fine-tuned ML model associated with the user activity and load the identified fine-tuned ML model for the ML chatbot. In Jack's case, the classification model may determine Jack is trying to obtain information for new driver automobile insurance, such as a price quote. As such, the server may load one or more fine-tuned ML models that are trained to provide information related to automobile insurance for new drivers, such as information needed for an automobile insurance policy, pricing, rewards or discounts, etc. For example, in response to the one or more Jack's requests for information, Jack's interactions, and/or Jack's user activity, the ML chatbot may load an appropriate fine-tuned ML model to generate the response in chat window 810 which indicates the ML chatbot may provide various new driver automobile insurance quotes and/or may require additional information from Jack to do so.

In one embodiment the server via one or more ML models may generate marketing content for Jack based upon his user profile, his request for information, his user interactions, his user activity classification, and/or any other suitable information. For example, while Jack is at the website, the ML chatbot may generate the advertisement 814 for display at the portal which is advertising discounts for new driver automobile policies based upon Jack's user interactions and/or type of user activity, such as his search box 808 text entry, his selection of icons 802A, 804, 806A, 812, and/or any other suitable interaction or activity at the website.

Exemplary Computer-Implemented Method for Generating Social Media Content for a User Associated with an Enterprise Using ML FIG. 9 depicts a flow diagram of an exemplary computer-implemented method 900 for generating social media content for a user associated with an enterprise using ML, according to one embodiment. One or more steps of the method 900 may be implemented as a set of instructions stored on a computer-readable memory and executable on one or more processors. The method 900 of FIG. 9 may be implemented via one or more local or remote processors such as processor 120, servers such as server 105, trans-ceivers, sensors, memory units such as memory 122, user devices such as user device 115, mobile devices such as mobile device 215, wearables, smart watches, smart contact lenses, smart glasses, AR viewer devices such as AR viewer device 300, VR viewer devices such as VR viewer 350, MR or extended reality glasses, headsets, and/or devices, voice bots or chatbots, ChatGPT bots, and/or other electronic or electrical components, which may be in wired or wireless communication with one another. The computer-implemented method 900 may use ML to generate social media content, such as one or more of text, an image, audio, video, multimedia, a blockchain record, augmented reality content, virtual reality content, metaverse content, and/or any other suitable content, for a user associated with an enterprise.

The computer-implemented method 900 may include receiving, by one or more processors from the user via a user device, a request for information (block 902). The computer-implemented method 900 may provide, by the one or more processors, the request for the information to an ML chatbot (block 904), wherein the ML chatbot may be trained to generate a response (such as a verbal, audible, textual, display, visual, or other response) based upon a user profile associated with the user. The user profile may indicate user attributes, such as one or more of a role of the user at the enterprise, a user location, product offerings of the enterprise, and/or target demographics of the enterprise, or any other suitable data. The user profile may be associated with a generic user, e.g., rather than an existing, human user associated with a user profile, the user profile may be associated with specific qualities, attributes and the like of a person and/or user who does not exist.

In one aspect of the computer-implemented method 900, the ML chatbot may be trained using historical training data indicative of a style of communication associated with the user profile. The historical training data may include one or more historical social media posts of the user. The style of communication may include one or more of vocabulary, phrasing, accent, tone, sentiment, conciseness, and/or medium of communication, or any other suitable style of communication.

The computer-implemented method 900 may include obtaining, by the one or more processors, an output of the ML chatbot that is responsive to the request (block 906), and generating, by the one or more processors, the social media content based upon the output (block 908). The computer-implemented method 900 may include providing, by the one or more processors, the social media content to the user device (block 910), wherein the social media content may include visual, text, or graphic content that is displayed, and/or a verbal or audible content that is provided via a speaker, and/or other suitable content.

In one embodiment, the ML chatbot of the computer-implemented method 900 may be based upon a fine-tuned ML model. The computer-implemented method 900 may include (1) training, by the one or more processors, a base ML model using historical enterprise data; (2) fine-tuning, by the one or more processors, the base ML model based upon a plurality of training data associated with a plurality of user profiles to generate a plurality of fine-tuned ML models associated with the plurality of user profiles; and (3) storing, by the one or more processors, the plurality of fine-tuned ML models, e.g., in a memory of a server such as memory 122 and/or database 126.

In one embodiment, the computer-implemented method 900 may include (1) obtaining, by the one or more processors, the user profile associated with the user; (2) identifying, by the one or more processors, a fine-tuned ML model of the plurality of fine-tuned ML models associated with the user profile; and (3) loading, by the one or more processors, the identified fine-tuned ML model for the ML chatbot into one or more memories (e.g., memory 122 and/or database 126) for use as the ML chatbot.

In one embodiment, the computer-implemented method 900 may include (1) tracking, by the one or more processors, user data associated with the user, such as social media posts, user-generated content, data indicating a style of communication of the user, or any other suitable user data; (2) updating, by the one or more processors, the user profile associated with the user with the user data; and (3) training, by the one or more processors, the fine-tuned ML model associated with the user profile with the updated user profile. This may allow, for example, the fine-tuned ML model to generate content more accurately reflecting the style of communication of the user, reflecting the most recent style of communication of the user, and the like.

In one embodiment, the computer-implemented method 900 may include analyzing, by the one or more processors, the historical training data to identify data indicating an exclusionary sentiment, which may include exclusionary social media content of a social media account. The computer-implemented method 900 may include removing, by the one or more processors, the identified data from the historical training data and/or removing the exclusionary social media content from the social media account. In one aspect, removing one or both types of data/content may allow the social media content generated for the user of the enterprise, and/or the social media account, to reflect the corporate identity, tone and/or sentiment of the enterprise, of the user, and/or address other messing considerations, among other things.

It should be understood that not all blocks of the exemplary flow diagram 900 are required to be performed. Moreover, the exemplary flow diagram 900 is not mutually exclusive from the other flow diagrams described herein, such as flow diagrams 1000, 1100 (e.g., block(s) from exemplary flow diagram 900 may be performed in any particular implementation).

Figure 10:
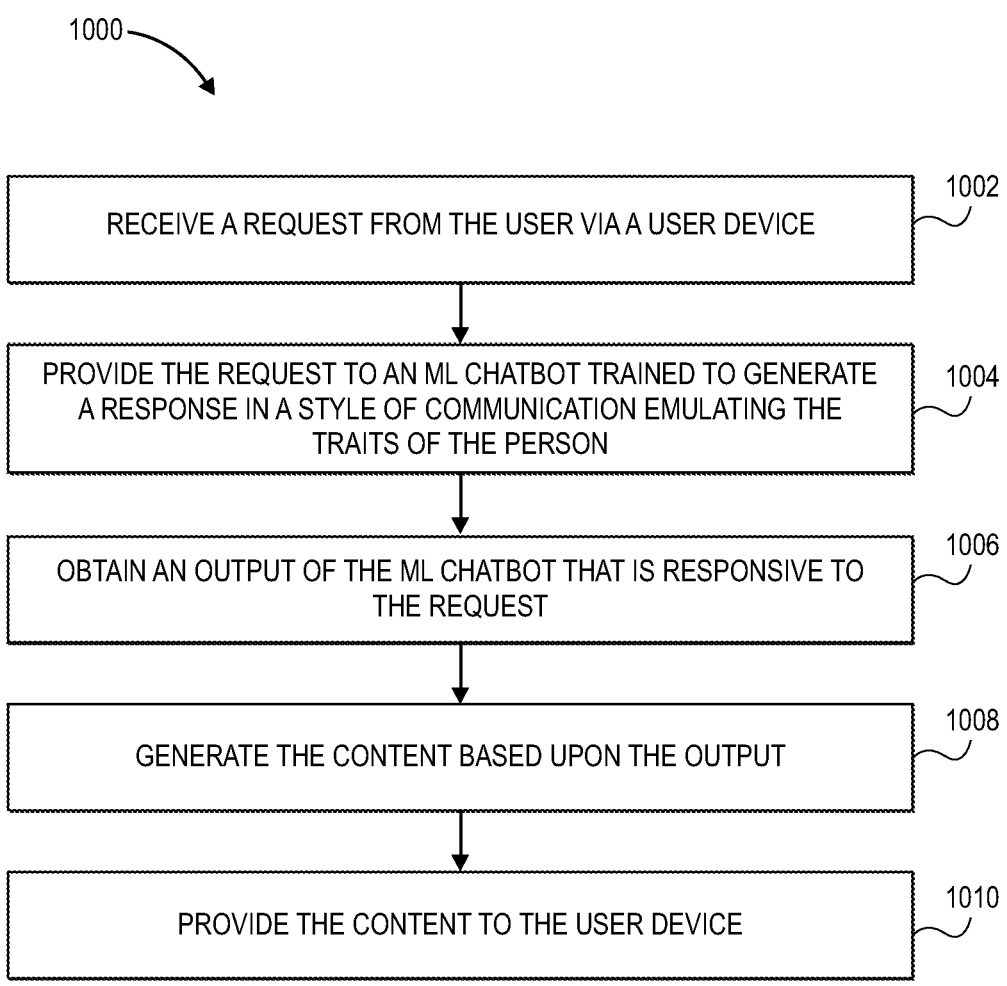
FIG. 10 depicts a flow diagram of an exemplary computer-implemented method for providing information via an ML chatbot emulating traits of a person, according to one embodiment.

Exemplary Computer-Implemented Method for Providing Information Via an ML Chatbot Emulating Traits of a Person FIG. 10 depicts a flow diagram of an exemplary computer-implemented method 1000 for providing information via an ML chatbot emulating traits of a person, according to one embodiment. One or more steps of the method 1000 may be implemented as a set of instructions stored on a computer-readable memory and executable on one or more processors. The method 1000 of FIG. 10 may be implemented via one or more local or remote processors such as processor 120, servers such as server 105, transceivers, sensors, memory units such as memory 122, user devices such as user device 115, mobile devices such as mobile device 215, wearables, smart watches, smart contact lenses, smart glasses, AR viewer devices such as AR viewer device 300, VR viewer devices such as VR viewer 350, MR or extended reality glasses, headsets, and/or devices, voice bots or chatbots, ChatGPT bots, and/or other electronic or electrical components, which may be in wired or wireless communication with one another. The computer-implemented method 1000 may use ML to generate content, such as one or more of text, an image, audio, video, multimedia, a blockchain record, augmented reality content, virtual reality content, metaverse content, and/or any other suitable content, for a user associated with an enterprise.

The computer-implemented method 1000 may include receiving, by one or more processors from the user via a user device, a request (block 1002), and providing, by the one or more processors, the request to an ML chatbot (block 1004). The ML chatbot may be trained to generate a response in a style of communication emulating the traits of the person, e.g., one or more of vocabulary, phrasing, accent, tone, sentiment, conciseness, humor, and/or depth of knowledge.

In one aspect of the computer-implemented method 1000, the ML chatbot may be trained using historical training data indicative of the traits of the person. The historical training data may include personal content created by the person, such as written content, audio content, image content, and/or video content.

In one aspect of the computer-implemented method 1000, the ML chatbot may be based upon a fine-tuned ML model. The computer-implemented method 1000 may include (i) training, by the one or more processors, a base ML model using historical base model training data; (ii) fine-tuning, by the one or more processors, the base ML model based upon a plurality of training data associated with a plurality of persons having associated traits to generate a plurality of fine-tuned ML models associated with the respective plurality of persons; and (iii) storing, by the one or more processors, the plurality of fine-tuned ML models.

The computer-implemented method 1000 may include obtaining, by the one or more processors, an indication of a person. Obtaining the indication of the person may include (i) generating, by the one or more processors, a model selection interface, the model selection interface providing a selection element for selecting persons associated with fine-tuned ML models; (ii) providing, by the one or more processors, the model selection interface to the user device; and (iii) detecting, via the model selection interface, the indication of the person.

The computer-implemented method 1000 may include identifying, by the one or more processors, a fine-tuned ML model of the plurality of fine-tuned ML models associated with the indicated person and loading, by the one or more processors, the identified fine-tuned ML model for the ML chatbot into one or more memories for use as the ML chatbot.

The computer-implemented method 1000 may include (i) obtaining, by the one or more processors, an output of the ML chatbot that is responsive to the request (block 1006); (ii) generating, by the one or more processors, content based upon the output (block 1008); and (iii) providing, by the one or more processors, the content to the user device (block 1010).

In one aspect, of the computer-implemented method 1000, the content may be associated with a tour. In one embodiment of the computer-implemented method 1000, the user device is a viewer device such as VR viewer device 350, the content is VR content, and the tour is a VR tour. The computer-implemented method 1000 may further include (i) obtaining, by the one or more processors, a virtual model associated with the VR tour, e.g., from a server; (ii) generating, by the one or more processors, a virtual configuration based upon the VR tour; and (iii) presenting, via the display of the viewer device, the virtual configuration.

The computer-implemented method 1000 may include detecting, via the one or more processors, that the output of the ML chatbot includes an indication of an object of interest not included in the virtual configuration, and updating, via the one or more processors, the virtual configuration to include the object of interest.

In one embodiment of the computer-implemented method 1000, the user device is a viewer device such as AR viewer device 300, the content is AR content, and the tour is an AR tour. The computer-implemented method 1000 may further include (i) determining, via the one or more processors, a field of view of the viewer device associated with a user; (ii) based upon the field of view, determining, by the one or more processors, a position of an object of interest relative to the user; (iii) identifying, by the one or more processors, the object of interest; (iv) responsive to identifying the object of interest, obtaining, by the one or more processors (e.g., from the server), a model associated with the object of interest; and (v) based upon the position of the object of interest, overlaying, via the one or more processors, the object of interest model onto the object of interest via a display of the viewer device to generate a virtual configuration of the object of interest model proximate the object of interest.

In one embodiment of the computer-implemented method 1000, the content is audio-guided content and the tour is a location-based audio-guided tour. The computer-implemented method 1000 may further include identifying, by the one or more processors, a location of the user, and responsive to identifying a location of the user, outputting, via the one or more processors, at least a portion of the audio-guided content associated with the identified user location.

It should be understood that not all blocks of the exemplary flow diagram 1000 are required to be performed. Moreover, the exemplary flow diagram 1000 is not mutually exclusive from the other flow diagrams described herein, such as flow diagrams 900, 1100 (e.g., block(s) from exemplary flow diagram 1000 may be performed in any particular implementation).

Figure 11:
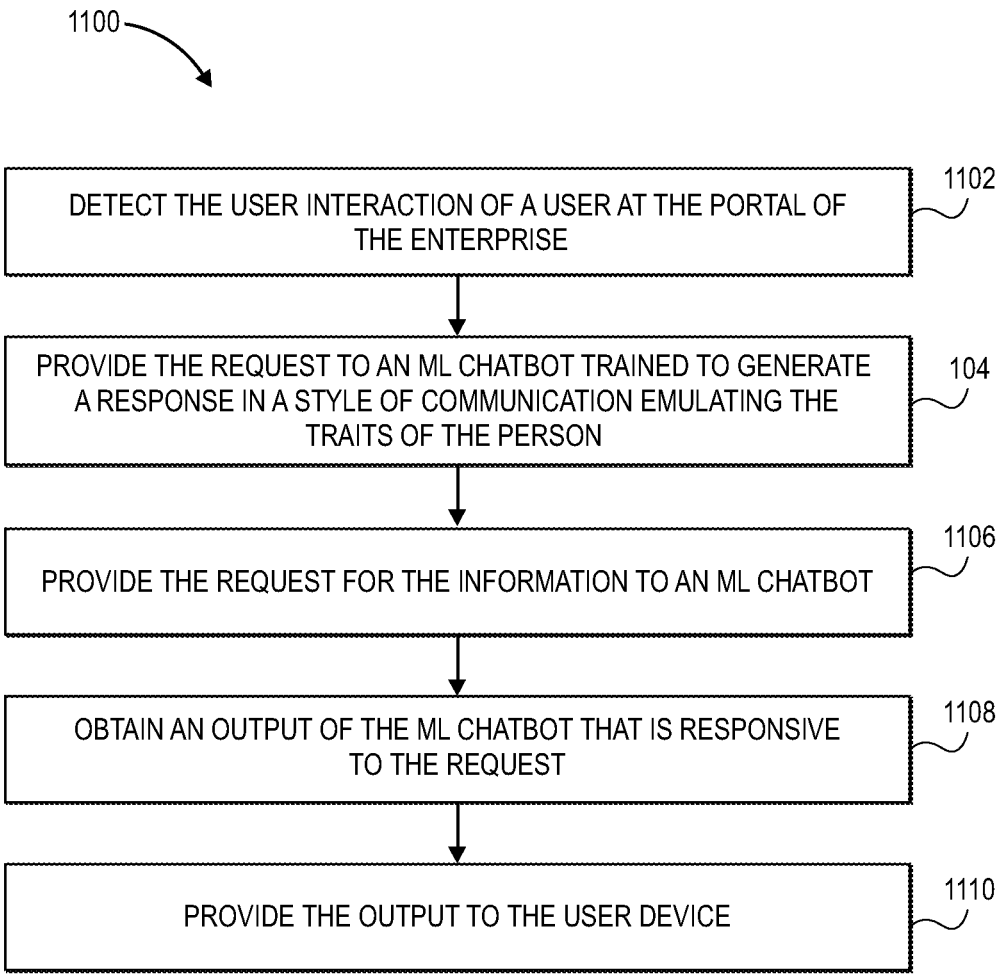
FIG. 11 depicts a flow diagram of an exemplary computer-implemented method for providing information based upon user interaction at a portal of an enterprise using ML, according to one embodiment.

Exemplary Computer-Implemented Method for Providing Information Based Upon User Interaction at a Portal of an Enterprise Using ML FIG. 11 depicts a flow diagram of an exemplary computer-implemented method 1100 for providing information based upon user interaction at a portal of an enterprise using ML, according to one embodiment. One or more steps of the method 1100 may be implemented as a set of instructions stored on a computer-readable memory and executable on one or more processors. The method 1100 of FIG. 11 may be implemented via one or more local or remote processors such as processor 120, servers such as server 105, transceivers, sensors, memory units such as memory 122, user devices such as user device 115, mobile devices such as mobile device 215, wearables, smart watches, smart contact lenses, smart glasses, AR viewer devices such as AR viewer device 300, VR viewer devices such as VR viewer 350, MR or extended reality glasses, headsets, and/or devices, voice bots or chatbots, ChatGPT bots, and/or other electronic or electrical components, which may be in wired or wireless communication with one another. The computer-implemented method 1100 may use ML to generate content, such as one or more of text, an image, audio, video, multimedia, a blockchain record, augmented reality content, virtual reality content, metaverse content, and/or any other suitable content, for a user associated with an enterprise.

The computer-implemented method 1100 may include detecting, by one or more processors, the user interaction of a user at the portal of the enterprise (block 1102), such as one or more of a website, a mobile application, an interactive-voice response, and/or a metaverse interaction, and receiving, by one or more processors via the portal, a request for information from the user (block 1104). The request for information may include information related to the enterprise (e.g., products, services, etc.), and/or any other suitable request at the portal.

The computer-implemented method 1100 may include providing, by the one or more processors, the request for the information to an ML chatbot (block 1106). In one aspect, the ML chatbot may be trained to generate a response based upon the user interaction of the user at the portal and/or the ML chatbot may be trained using historical training data indicative of historical user interactions of a plurality of historical users at the portal.

The computer-implemented method 1100 may include obtaining, by the one or more processors, an output of the ML chatbot that is responsive to the request (block 1108), and providing, by the one or more processors, the output to the user device (block 1110).

In one embodiment of the computer-implemented method 1100, the ML chatbot may be based upon a fine-tuned ML model. The computer-implemented method 1100 may include (i) training, by the one or more processors, a base ML model using historical enterprise data; (ii) fine-tuning, by the one or more processors, the base ML model based upon a plurality of user profiles associated with a plurality of types of user activity at the portal to generate a plurality of fine-tuned ML models associated with the plurality of types of user activity; and (iii) storing, by the one or more processors, the plurality of fine-tuned ML models.

The computer-implemented method 1100 may include tracking, by the one or more processors, the user interaction of the user at the portal, such entering text, a signal from an input device, visiting a hyperlink, uploading content, and/or viewing content, and/or any other suitable user interaction at the portal. Tracking the user interaction may include one or more of a session identifier, a user identifier and/or a user device identifier, or any other suitable manner of tracking a user interaction.

The computer-implemented method 1100 may include classifying, by the one or more processors, the user interaction data associated with the user interaction to a particular type of user activity. Classifying the user interaction may include inputting, by the one or more processors, the user interaction data into a classification model trained to output a type of user activity based upon input user interaction data. The types of user activity may include one or more of searching, an inquiry, requesting a quote, and/or submitting a claim, or any other suitable user activity.

The computer-implemented method 1100 may include identifying, by the one or more processors, the fine-tuned ML model associated with the particular type of user activity for the ML chatbot, and loading, by the one or more processors, the identified fine-tuned ML model for the ML chatbot into the one or more memories.

The computer-implemented method 1100 may include analyzing, by the one or more processors, the user profile to generate marketing content associated with the user. In one aspect of the computer-implemented method 1100, generating the marketing content may include (i) generating, via the one or more processors, a request for the marketing content; (ii) inputting, via the one or more processors, the request into the ML chatbot; and (iii) obtaining, via the one or more processors, an output of the ML chatbot that includes the marketing content. The computer-implemented method 1100 may include providing, by the one or more processors, the marketing content to the user device.

It should be understood that not all blocks of the exemplary flow diagram 1100 are required to be performed. Moreover, the exemplary flow diagram 1100 is not mutually exclusive from the other flow diagrams described herein, such as flow diagrams 900, 1000 (e.g., block(s) from exemplary flow diagram 1100 may be performed in any particular implementation).

Additional Considerations

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software
to perform certain operations. It will be appreciated that the
decision to implement a hardware module mechanically, in
dedicated and permanently configured circuitry, or in tem-
porarily configured circuitry (e.g., configured by software)
may be driven by cost and time considerations.

Accordingly, the term "hardware module" should be
understood to encompass a tangible entity, be that an entity
that is physically constructed, permanently configured (e.g.,
hardwired), or temporarily configured (e.g., programmed) to
operate in a certain manner or to perform certain operations
described herein. Considering embodiments in which hard-
ware modules are temporarily configured (e.g., pro-
grammed), each of the hardware modules need not be
configured or instantiated at any one instance in time. For
example, where the hardware modules comprise a general-
purpose processor configured using software, the general-
purpose processor may be configured as respective different
hardware modules at different times. Software may accord-
ingly configure a processor, for example, to constitute a
particular hardware module at one instance of time and to
constitute a different hardware module at a different instance
of time.

Hardware modules can provide information to, and
receive information from, other hardware modules. Accord-
ingly, the described hardware modules may be regarded as
being communicatively coupled. Where multiple of such
hardware modules exist contemporaneously, communica-
tions may be achieved through signal transmission (e.g.,
over appropriate circuits and buses) that connect the hard-
ware modules. In embodiments in which multiple hardware
modules are configured or instantiated at different times,
communications between such hardware modules may be
achieved, for example, through the storage and retrieval of
information in memory structures to which the multiple
hardware modules have access. For example, one hardware
module may perform an operation and store the output of
that operation in a memory device to which it is communi-
catively coupled. A further hardware module may then, at a
later time, access the memory device to retrieve and process
the stored output. Hardware modules may also initiate
communications with input or output devices, and can
operate on a resource (e.g., a collection of information).

The various operations of exemplary methods described
herein may be performed, at least partially, by one or more
processors that are temporarily configured (e.g., by soft-
ware) or permanently configured to perform the relevant
operations. Whether temporarily or permanently configured,
such processors may constitute processor-implemented
modules that operate to perform one or more operations or
functions. The modules referred to herein may, in some
exemplary embodiments, comprise processor-implemented
modules.

Similarly, the methods or routines described herein may
be at least partially processor-implemented. For example, at
least some of the operations of a method may be performed
by one or more processors or processor-implemented hard-
ware modules. The performance of certain of the operations
may be distributed among the one or more processors, not
only residing within a single machine, but deployed across
a number of machines. In some exemplary embodiments, the
processor or processors may be located in a single location
(e.g., within a home environment, an office environment or
as a server farm), while in other embodiments the processors
may be distributed across a number of geographic locations.

Unless specifically stated otherwise, discussions herein
using words such as processing," "computing." "calculating." "determining," "presenting." "displaying." or the like
may refer to actions or processes of a machine (e.g., a
computer) that manipulates or transforms data represented
as physical (e.g., electronic, magnetic, or optical) quantities
within one or more memories (e.g., volatile memory, non-
volatile memory, or a combination thereof), registers, or
other machine components that receive, store, transmit, or
display information.

As used herein any reference to "one embodiment" or "an
embodiment" means that a particular element, feature, struc-
ture, or characteristic described in connection with the
embodiment may be included in at least one embodiment.
The appearances of the phrase "in one embodiment" in
various places in the specification are not necessarily all
referring to the same embodiment.

Some embodiments may be described using the expres-
sion "coupled" and "connected" along with their derivatives.
For example, some embodiments may be described using
the term "coupled" to indicate that two or more elements are
in direct physical or electrical contact. The term "coupled,"
however, may also mean that two or more elements are not
in direct contact with each other, but yet still co-operate or
interact with each other. The embodiments are not limited in
this context.

As used herein, the terms "comprises," "comprising."
"includes," "including." "has," "having" or any other varia-
tion thereof, are intended to cover a non-exclusive inclusion.
For example, a process, method, article, or apparatus that
comprises a list of elements is not necessarily limited to only
those elements but may include other elements not expressly
listed or inherent to such process, method, article, or appa-
ratus. Further, unless expressly stated to the contrary, "or"
refers to an inclusive or and not to an exclusive or. For
example, a condition A or B is satisfied by any one of the
following: A is true (or present) and B is false (or not
present), A is false (or not present) and B is true (or present),
and both A and B are true (or present).

In addition, use of the "a" or "an" are employed to
describe elements and components of the embodiments
herein. This is done merely for convenience and to give a
general sense of the description. This description, and the
claims that follow, should be read to include one or at least
one and the singular also includes the plural unless it is
obvious that it is meant otherwise.

Upon reading this disclosure, those of skill in the art will
appreciate still additional alternative structural and func-
tional designs for the approaches described herein. There-
fore, while particular embodiments and applications have
been illustrated and described, it is to be understood that the
disclosed embodiments are not limited to the precise con-
struction and components disclosed herein. Various modifi-
cations, changes and variations, which will be apparent to
those skilled in the art, may be made in the arrangement,
operation and details of the method and apparatus disclosed
herein without departing from the spirit and scope defined in
the appended claims.

The particular features, structures, or characteristics of
any specific embodiment may be combined in any suitable
manner and in any suitable combination with one or more
other embodiments, including the use of selected features
without corresponding use of other features. In addition,
many modifications may be made to adapt a particular
application, situation or material to the essential scope and
spirit of the present invention. It is to be understood that
other variations and modifications of the embodiments of the
present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method for generating social media content for a user associated with an enterprise using machine learning (ML), the computer-implemented method comprising:

training, by one or more processors, a base ML model using historical enterprise data, wherein the base ML model comprises an input layer, at least one connected deep layer, and an output layer;

fine-tuning, by the one or more processors, the base ML model based upon a plurality of training data associated with a plurality of user profiles to generate a plurality of fine-tuned ML models associated with the plurality of user profiles, wherein fine-tuning the base ML model comprises adjusting at least one weight and at least one layer based upon the training data associated with the plurality of user profiles;

receiving, by the one or more processors from the user via a user device, a request for information;

obtaining, by the one or more processors, a user profile associated with a user;

providing, by the one or more processors, the request for the information to an ML chatbot based upon an identified fined-tuned ML model, wherein:

the ML chatbot is trained to generate a response based upon a user profile associated with the user; and the ML chatbot is trained using historical training data indicative of a style of communication associated with the user profile;

obtaining, by the one or more processors, an output of the ML chatbot that is responsive to the request;

generating, by the one or more processors, the social media content based upon the output; and providing, by the one or more processors, the social media content to the user device.

2. The computer-implemented method of claim 1, wherein the ML chatbot is based upon a fine-tuned ML model, the computer-implemented method further comprising:

storing, by the one or more processors, the plurality of fine-tuned ML models.

3. The computer-implemented method of claim 2, further comprising:

loading, by the one or more processors, the identified fine-tuned ML model for the ML chatbot into one or more memories for use as the ML chatbot.

4. The computer-implemented method of claim 2, further comprising:

tracking, by the one or more processors, user data associated with the user;

updating, by the one or more processors, the user profile associated with the user with the user data; and training, by the one or more processors, the fine-tuned ML model associated with the user profile with the updated user profile.

5. The computer-implemented method of claim 1, wherein the user profile indicates user attributes.

6. The computer-implemented method of claim 5, wherein the user attributes include one or more of a role of the user at the enterprise, a user location, product offerings of the enterprise, and/or target demographics of the enterprise.

7. The computer-implemented method of claim 1, wherein the user profile is associated with a generic user.

8. The computer-implemented method of claim 1, wherein the historical training data includes one or more historical social media posts of the user.

9. The computer-implemented method of claim 1, wherein the style of communication includes one or more of vocabulary, phrasing, accent, tone, sentiment, conciseness, and/or medium of communication.

10. The computer-implemented method of claim 1, further comprising:

analyzing, by the one or more processors, the historical training data to identify data indicating an exclusionary sentiment; and removing, by the one or more processors, the identified data from the historical training data.

11. The computer-implemented method of claim 10, wherein the identified data includes exclusionary social media content of a social media account, and further comprising:

removing, by the one or more processors, the exclusionary social media content from the social media account.

12. The computer-implemented method of claim 1, wherein the social media content includes one or more of text, an image, audio, video, multimedia, a blockchain record, augmented reality content, virtual reality content, and/or metaverse content.

13. A system for generating social media content for a user associated with an enterprise using machine learning (ML), the system comprising:

one or more processors; and one or more non-transitory memories storing processor-executable instructions that, when executed by the one or more processors, cause the system to:

train a base ML model using historical enterprise data, wherein the base ML model comprises an input layer, at least one connected deep layer, and an output layer;

fine-tune the base ML model based upon a plurality of training data associated with a plurality of user profiles to generate a plurality of fine-tuned ML models associated with the plurality of user profiles, wherein fine-tuning the base ML model comprises adjusting at least one weight and at least one layer based upon the training data associated with the plurality of user profiles;

receive a request for information from the user via a user device;

obtain a user profile associated with a user;

identify a fine-tuned ML model of the plurality of fine-tuned ML models associated with the user profile;

provide the request for the information to an ML chatbot based upon the identified fined-tuned ML model, wherein:

the ML chatbot is trained to generate a response based upon a user profile associated with the user; and the ML chatbot is trained using historical training data indicative of a style of communication associated with the user profile;

obtain an output of the ML chatbot that is responsive to the request;

generate the social media content based upon the output; and provide the social media content to the user device.

14. The system of claim 13, wherein the ML chatbot is based upon a fine-tuned ML model, the system further comprising instructions that, when executed by the one or more processors, cause the system to:

store the plurality of fine-tuned ML models.

15. The system of claim 14, further comprising instructions that, when executed by the one or more processors, cause the system to:

load the identified fine-tuned ML model for the ML chatbot into one or more memories for use as the ML chatbot.

16. The system of claim 14, further comprising instructions that, when executed by the one or more processors, cause the system to:

track user data associated with the user;

update the user profile associated with the user with the user data; and train the fine-tuned ML model associated with the user profile with the updated user profile.

17. The system of claim 13, wherein the historical training data includes one or more historical social media posts of the user.

18. The system of claim 13, wherein the style of communication includes one or more of vocabulary, phrasing, accent, tone, sentiment, conciseness, and/or medium of communication.

19. The system of claim 13, wherein the social media content includes one or more of text, an image, audio, video, multimedia, a blockchain record, augmented reality content, virtual reality content, and/or metaverse content.

20. A non-transitory computer-readable medium storing processor-executable instructions for generating social media content that, when executed by one or more processors, cause the one or more processors to:

train a base ML model using historical enterprise data, wherein the base ML model comprises an input layer, at least one connected deep layer, and an output layer;

fine-tune the base ML model based upon a plurality of training data associated with a plurality of user profiles to generate a plurality of fine-tuned ML models associated with the plurality of user profiles, wherein fine-tuning the base ML model comprises adjusting at least one weight and at least one layer based upon the training data associated with the plurality of user profiles;

receive a request for information from a user via a user device;

obtain a user profile associated with a user;

identify a fine-tuned ML model of the plurality of fine-tuned ML models associated with the user profile;

provide the request for the information to an ML chatbot based upon the identified fined-tuned ML model, wherein:

the ML chatbot is trained to generate a response based upon a user profile associated with the user; and the ML chatbot is trained using historical training data indicative of a style of communication associated with the user profile;

obtain an output of the ML chatbot that is responsive to the request;

generate the social media content based upon the output; and provide the social media content to the user device.

* * * * *